(12) United States Patent
Hayakawa

(10) Patent No.: US 12,118,137 B2
(45) Date of Patent: Oct. 15, 2024

(54) BOUNDARY SETTING DEVICE, BOUNDARY SETTING METHOD, AND PROGRAM

(71) Applicant: Sony Interactive Entertainment Inc., Tokyo (JP)

(72) Inventor: Yuto Hayakawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 125 days.

(21) Appl. No.: 17/436,839

(22) PCT Filed: Mar. 27, 2020

(86) PCT No.: PCT/JP2020/014177
§ 371 (c)(1),
(2) Date: Sep. 7, 2021

(87) PCT Pub. No.: WO2020/203831
PCT Pub. Date: Oct. 8, 2020

(65) Prior Publication Data
US 2022/0179482 A1 Jun. 9, 2022

(30) Foreign Application Priority Data
Mar. 29, 2019 (JP) ................................ 2019-067085

(51) Int. Cl.
*G06F 3/00* (2006.01)
*G06F 3/01* (2006.01)
(Continued)

(52) U.S. Cl.
CPC ................ *G06F 3/012* (2013.01); *G06T 7/60* (2013.01); *G06T 7/73* (2017.01); *G06T 11/00* (2013.01);
(Continued)

(58) Field of Classification Search
CPC .......... G06F 3/012; G06F 3/011; G06F 3/147; G06T 7/60; G06T 7/73; G06T 11/00;
(Continued)

(56) References Cited

U.S. PATENT DOCUMENTS 6,028,609 A * 2/2000 Kawakami .............. G06F 3/011
345/474
6,091,395 A * 7/2000 DeStefano ............ G06F 3/0481
715/788
(Continued)

FOREIGN PATENT DOCUMENTS

| CN | 101685611 A | 3/2010 |
| CN | 101907936 A | 12/2010 |

(Continued)

OTHER PUBLICATIONS

International Search Report for corresponding PCT Application No. PCT/JP2020/014177, 6 pages, dated Jun. 2, 2020.
(Continued)

*Primary Examiner* — Daniel Previl
(74) *Attorney, Agent, or Firm* — Matthew B. Dernier, Esq.

(57) ABSTRACT

A boundary surface setting section sets the boundary surface for delimiting a permissible region that is the region which is located inside the real space and in which the user wearing a head-mounted display is permitted to exist and an impermissible region that is the region which is located inside the real space and in which the user is not permitted to exist. A display control section causes a portion or a whole of a virtual object representing the boundary surface to be displayed on the head-mounted display. The boundary surface includes a first boundary line having a first height and a
(Continued)

second boundary line having a second height, and a portion or all of the first boundary line is different from the second boundary line.

11 Claims, 17 Drawing Sheets

(51) Int. Cl.
*G06T 7/60* (2017.01)
*G06T 7/73* (2017.01)
*G06T 11/00* (2006.01)
*G06V 20/20* (2022.01)

(52) U.S. Cl.
CPC .... *G06V 20/20* (2022.01); *G06T 2207/30241* (2013.01)

(58) Field of Classification Search
CPC ... G06T 2207/30241; G06T 2219/2021; G06T 19/20; G06T 2219/012; G06V 20/20; G09G 5/377; G09G 2354/00
USPC .. 340/686.6, 639, 691.6, 693.9, 3.1, 825.23, 340/825.27, 7.55
See application file for complete search history.

(56) References Cited

U.S. PATENT DOCUMENTS

| | | | |
|---|---|---|---|
| 8,144,141 | B2 | 3/2012 | Hirose |
| 8,531,395 | B2 | 9/2013 | Sawai |
| 9,047,698 | B2 | 6/2015 | Maciocci |
| 9,102,055 | B1 | 8/2015 | Konolige |
| 9,245,388 | B2 | 1/2016 | Poulos |
| 9,671,868 | B2* | 6/2017 | Kawalkar ............ G06F 3/04886 |
| 10,019,057 | B2 | 7/2018 | Osman |
| 10,446,041 | B1* | 10/2019 | Robertson .............. G01C 23/00 |
| 10,528,125 | B2 | 1/2020 | Kuehne |
| 2009/0262192 | A1* | 10/2009 | Schofield ............... H04N 7/181 348/148 |
| 2010/0079429 | A1 | 4/2010 | Hirose |
| 2010/0234173 | A1* | 9/2010 | Miyazaki .............. B60W 10/06 477/3 |
| 2010/0309123 | A1 | 12/2010 | Sawai |
| 2012/0210254 | A1 | 8/2012 | Fukuchi |
| 2012/0249416 | A1 | 10/2012 | Maciocci |
| 2014/0333666 | A1 | 11/2014 | Poulos |
| 2014/0361976 | A1* | 12/2014 | Osman ................. G02B 27/017 345/156 |
| 2016/0232647 | A1* | 8/2016 | Carlos ................... G06F 3/1454 |
| 2017/0205892 | A1* | 7/2017 | Petrovskaya ........... G06F 3/011 |
| 2017/0206712 | A1 | 7/2017 | Petrovskaya |
| 2017/0352192 | A1 | 12/2017 | Petrovskaya |
| 2018/0004286 | A1 | 1/2018 | Chen |
| 2018/0136716 | A1* | 5/2018 | Kuehne ................... G06F 3/012 |
| 2019/0079597 | A1* | 3/2019 | Kada ...................... A63F 13/49 |
| 2019/0130733 | A1* | 5/2019 | Hodge .................. G08B 25/10 |
| 2020/0185877 | A1* | 6/2020 | Kawaguchi ......... H01S 5/02326 |
| 2020/0400957 | A1* | 12/2020 | Van Heugten ..... G02B 27/0172 |
| 2021/0329265 | A1* | 10/2021 | Wang .................... H04N 19/30 |

FOREIGN PATENT DOCUMENTS

| | | |
|---|---|---|
| CN | 103460255 A | 12/2013 |
| CN | 105264461 A1 | 1/2016 |
| CN | 105324738 A | 2/2016 |
| CN | 107533364 A | 1/2018 |
| JP | 2012168646 A | 9/2012 |
| JP | 2017119031 A | 7/2017 |
| JP | 2018065396 A | 3/2018 |
| JP | 6401841 B1 | 10/2018 |
| JP | 2019175323 A | 10/2019 |
| WO | 2016094568 A1 | 6/2016 |
| WO | 2017115793 A1 | 7/2017 |

OTHER PUBLICATIONS

Mogulive Oculus VR, Guardian, "Chaperone' System" Using for Installation, The Guardian, Boundary System Adapted to Oculus VR Style, 4 pages, Sep. 16, 2016 (for relevancy see ISR for PCT Application No. PCT/JP2020/014177, dated Jun. 2, 2020, cited above).
Notice of Reasons for Refusal for corresponding JP Application No. 2021-521037, 16 pages, dated Feb. 3, 2022.
Extended European Search Report for corresponding EP Application No. 20784878.9, 13 pages, dated Nov. 16, 2022.
The First Office Action for corresponding CN Application No. 202080022160.X, 27 pages, dated Aug. 31, 2023.
Notice of Reasons for Refusal for corresponding JP Application No. 2022-093703, 7 pages, dated Feb. 2, 2024.

* cited by examiner

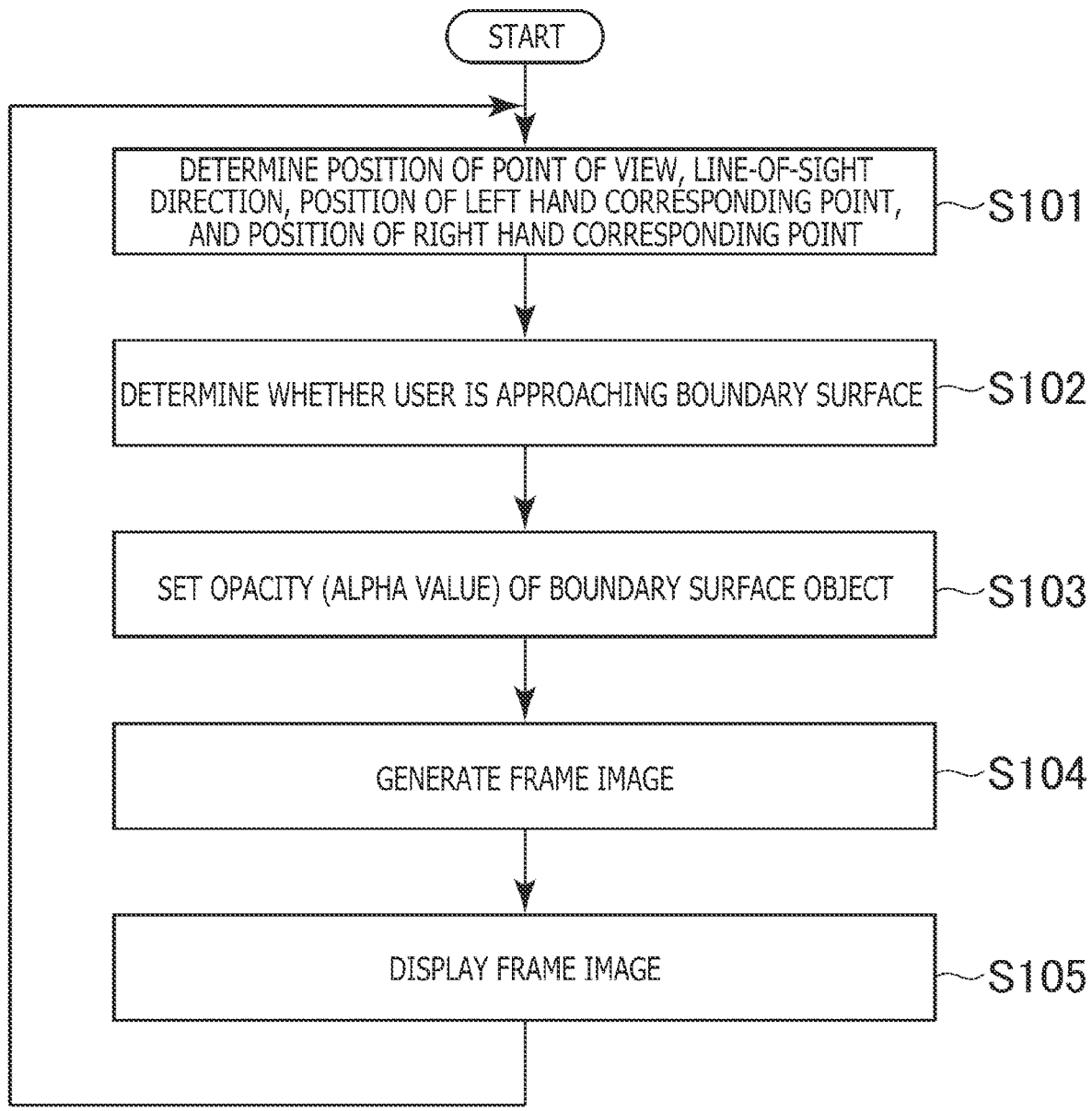

BOUNDARY SETTING DEVICE, BOUNDARY SETTING METHOD, AND PROGRAM

TECHNICAL FIELD

The present invention relates to a boundary setting device, a boundary setting method, and a program.

BACKGROUND ART

There exists a virtual reality (VR) technology that allows the condition of a virtual space to be displayed on a display unit equipped in a head-mounted display (HMD).

In such a VR technology, when the condition of the virtual space is being displayed on the display unit, in general, a user wearing the HMD is unable to visually recognize the condition of a real space. For this reason, a technology which maintains the immersive feeling of the user wearing the HMD with its display unit displaying the condition of the virtual space and which simultaneously therewith prevents the user from coming into contact with objects of the real space, such as an object arranged on the floor and a wall, is important.

As an example of such a technology, there exists a technology for setting a boundary surface for delimiting a region which is located inside the real space and in which the user is permitted to exist (this region hereinafter being referred to as a permissible region) and a region which is located inside the real space and in which the user is not permitted to exist (this region being hereinafter referred to as an impermissible region). This technology causes the display unit equipped in the HMD to, when the user wearing the HMD has approached a preliminarily set boundary surface, display a virtual object representing the boundary surface. Thus, setting a region in which no object is arranged to the permissible region makes it possible to prevent the user wearing the HMD from coming into contact with the objects.

SUMMARY

Technical Problem

The above technology, however, is incapable of setting a boundary surface whose boundary lines differ according to the height.

Thus, in order to set the permissible region so as to avoid the object arranged on the floor, it is necessary to set the boundary surface such that the whole of a region including the object and extending in a height direction is included in the impermissible region. Consequently, the permissible region becomes smaller.

The present invention has been made in view of the above-described actual situation, and an object of the present invention is to provide a boundary setting device, a boundary setting method, and a program that are capable of more flexibly setting a boundary surface for delimiting a region which is located inside the real space and in which a user is permitted to exist and a region which is located inside the real space and in which the user is not permitted to exist.

Solution to Problem

In order to solve the above problem, a boundary setting device according to the present invention is a boundary setting device including a boundary surface setting section that sets a boundary surface for delimiting a permissible region that is a region which is located inside a real space and in which a user wearing a head-mounted display is permitted to exist and an impermissible region that is a region which is located inside the real space and in which the user is not permitted to exist, and a display control section that causes a portion or a whole of a virtual object representing the boundary surface to be displayed on the head-mounted display. The boundary surface includes a first boundary line having a first height and a second boundary line having a second height, and a portion or all of the first boundary line is different from the second boundary line.

In an aspect of the present invention, according to an operation of setting the first boundary line and the second boundary line, the boundary surface setting section sets the boundary surface including the first boundary line and the second boundary line.

In this aspect, according to the operation of setting the first boundary line and the second boundary line, the boundary surface setting section may set the boundary surface that, for a height lower than the first height, includes a boundary line obtained by parallel-shifting of the first boundary line and that, for a height higher than the second height, includes a boundary line obtained by parallel-shifting of the second boundary line.

Further, the boundary surface setting section may set the boundary surface including the first boundary line and the second boundary line that are set on the basis of a trajectory of a sensor that the user moves inside the real space.

Further, in an aspect of the present invention, according to an operation by the user for setting a point located inside the real space, the boundary surface setting section sets the boundary surface that is a spherical surface having a center on the point.

In this aspect, according to an operation of further setting a length, the boundary surface setting section may set the boundary surface that is a spherical surface having a center on the point and having a radius according to the length.

Further, in an aspect of the present invention, the boundary surface setting section sets the boundary surface circumscribing a trajectory of a sensor that the user moves inside the real space.

Further, in an aspect of the present invention, the boundary surface setting section sets the boundary surface for delimiting a region that is a field-of-view range of a camera arranged in the real space and a region that is not the field-of-view range.

Further, in an aspect of the present invention, the boundary surface setting section specifies an object arranged inside the real space, on the basis of a result of image recognition processing on an image shot by a camera arranged in the real space, and sets the boundary surface such that a region occupied by the object is included in the impermissible region.

Further, in an aspect of the present invention, according to an operation by the user for setting a region located more inside than the boundary surface, the boundary surface setting section changes the boundary surface such that the region is included in the impermissible region.

Further, in an aspect of the present invention, according to an operation by the user for setting a region located more outside than the boundary surface, the boundary surface setting section changes the boundary surface such that the region is included in the permissible region.

Further, a boundary setting method according to the present invention is a boundary setting method including a step of setting a boundary surface for delimiting a permissible region that is a region which is located inside a real space and in which a user wearing a head-mounted display is permitted to exist and an impermissible region that is a region which is located inside the real space and in which the user is not permitted to exist, and a step of causing a portion or a whole of a virtual object representing the boundary surface to be displayed on the head-mounted display. The boundary surface includes a first boundary line having a first height and a second boundary line having a second height, and a portion or all of the first boundary line is different from the second boundary line.

Further, a program according to the present invention is a program that causes a computer to perform a step of setting a boundary surface for delimiting a permissible region that is a region which is located inside a real space and in which a user wearing a head-mounted display is permitted to exist and an impermissible region that is a region which is located inside the real space and in which the user is not permitted to exist, and a step of causing a portion or a whole of a virtual object representing the boundary surface to be displayed on the head-mounted display. The boundary surface includes a first boundary line having a first height and a second boundary line having a second height, and a portion or all of the first boundary line is different from the second boundary line.

BRIEF DESCRIPTION OF DRAWINGS

FIG. 18 is a flowchart illustrating an example of the flow of processing performed in the entertainment device according to the embodiment of the present invention.

DESCRIPTION OF EMBODIMENT

Figure 1:
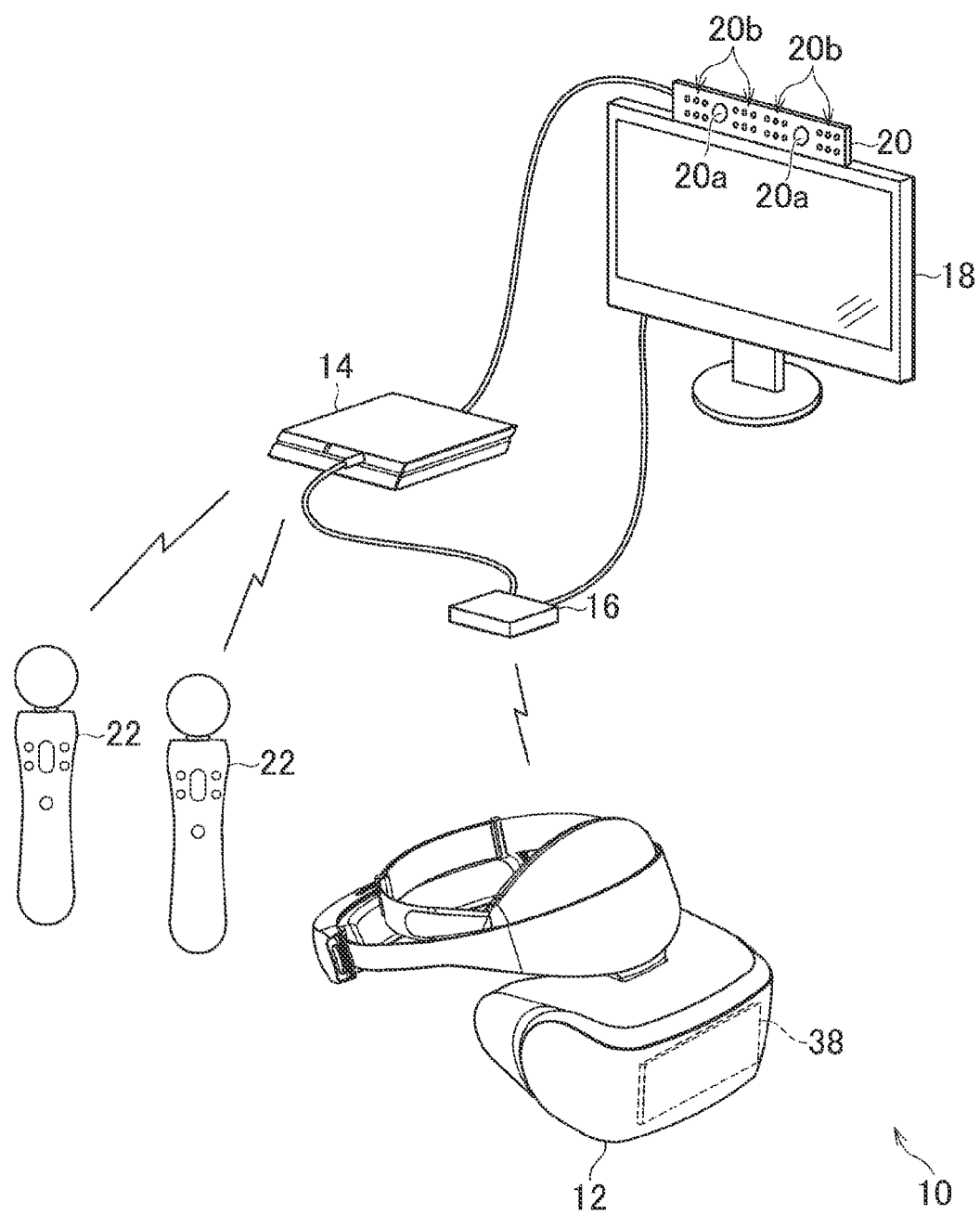
FIG. 1 is a diagram illustrating an example of an entire configuration of an entertainment system according to an embodiment of the present invention.

Hereinafter, an embodiment of the present invention will be described referring to the drawings.

Figure 2A:
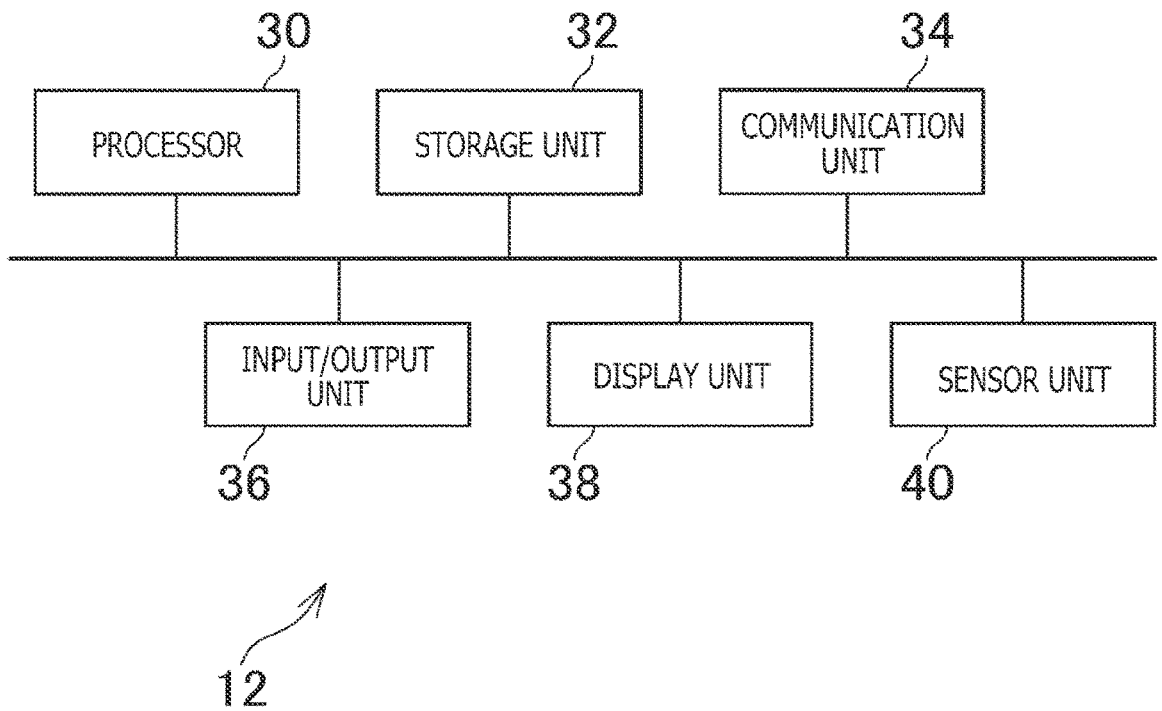
FIG. 2A is a diagram illustrating an example of a configuration of a head-mounted display according to the embodiment of the present invention.
Figure 2B:
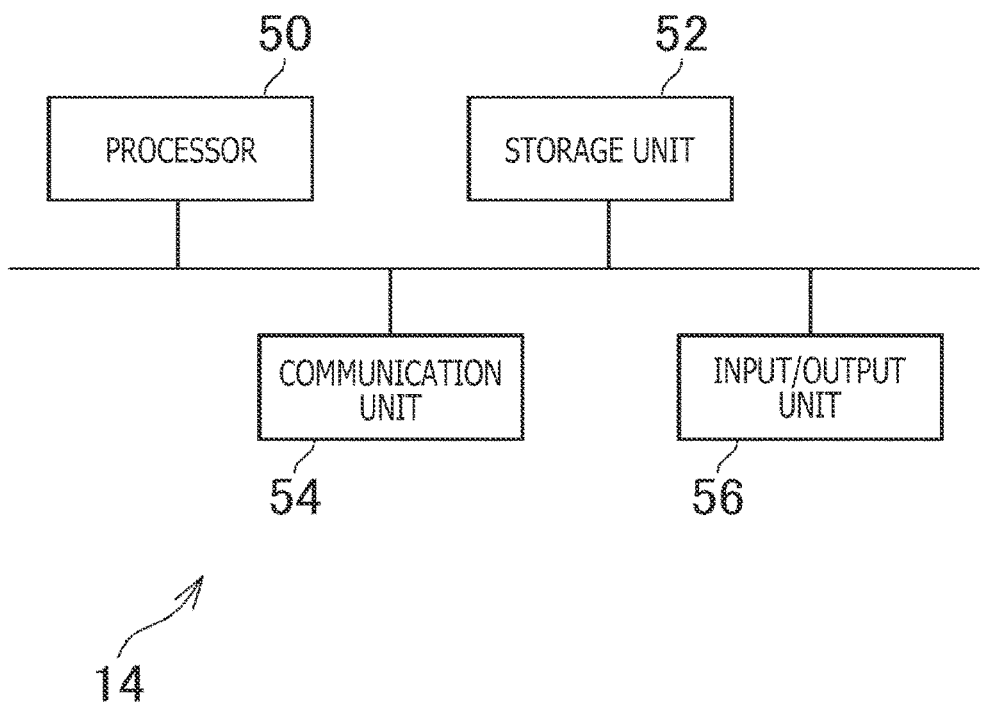
FIG. 2B is a diagram illustrating an example of a configuration of an entertainment device according to the embodiment of the present invention.

FIG. 1 is a diagram illustrating an example of an entire configuration of an entertainment system 10 according to an embodiment of the present invention. FIG. 2A is a diagram illustrating an example of a configuration of an HMD 12 according to the present embodiment. FIG. 2B is a diagram illustrating an example of a configuration of an entertainment device 14 according to the present embodiment.

As illustrated in FIG. 1, the entertainment system 10 according to the present embodiment includes the HMD 12, the entertainment device 14, a relay device 16, a display 18, a camera/microphone unit 20, and controllers 22.

The HMD 12 according to the present embodiment includes, for example, as illustrated in FIG. 2A, a processor 30, a storage unit 32, a communication unit 34, an input/output unit 36, a display unit 38, and a sensor unit 40.

The processor 30 is a program control device, such as a microprocessor, which operates in accordance with a program installed in, for example, the HMD 12.

The storage unit 32 corresponds to storage elements such as a ROM (Read-Only Memory) and a RAM (Random Access Memory), for example. The storage unit 32 stores therein the program and the like that are executed by the processor 30.

The communication unit 34 is a communication interface such as a wireless LAN (Local Area Network) module, for example.

The input/output unit 36 corresponds to input/output ports such as an HDMI (registered trademark) (High-Definition Multimedia Interface) port and a USB (Universal Serial Bus) port, for example.

The display unit 38 is a display such as a liquid crystal display or an organic EL (Electroluminescence) display, for example, and displays videos and the like that are generated by the entertainment device 14. As illustrated in FIG. 1, the display unit 38 is arranged at the front of eyes of a user when the user has worn the HMD 12. The display unit 38 may be configured to receive a video signal, for example, output by the entertainment device 14 and relayed by the relay device 16, and may output a video represented by the video signal. The display unit 38 according to the present embodiment is configured to be capable of displaying three-dimensional images by, for example, displaying images for a left eye and images for a right eye. Note that it does not matter even if the display unit 38 is a display incapable of displaying the three-dimensional images and capable of displaying only two-dimensional images.

The sensor unit 40 corresponds to sensors such as an acceleration sensor and a motion sensor, for example. The sensor unit 40 may output measurement results, such as a posture, a rotation amount, and a movement amount of the HMD 12, to the processor 30 at a predetermined sampling rate.

The entertainment device 14 according to the present embodiment is a computer such as a game console, a DVD (Digital Versatile Disc) player, or a Blu-ray (registered trademark) player. The entertainment device 14 according to the present embodiment generates videos and audios by executing a game program that, for example, is stored in the entertainment device 14 or is recorded in an optical disk, or by reproducing content that, for example, is stored in the entertainment device 14 or is recorded in an optical disk. Further, the entertainment device 14 according to the present embodiment outputs video signals representing the generated videos and audio signals representing the generated audios to the display 18 via the relay device 16.

The entertainment device 14 according to the present embodiment includes, for example, as illustrated in FIG. 2B, a processor 50, a storage unit 52, a communication unit 54, and an input/output unit 56.

The processor 50 is a program control device, such as a CPU (Central Processing Unit), which operates in accordance with a program installed in, for example, the entertainment device 14. The processor 50 according to the present embodiment also includes a GPU (Graphics Processing Unit) that draws an image in a frame buffer on the basis of a graphics command and data that are supplied from the CPU.

The storage unit 52 corresponds to storage elements such as a ROM and a RAM, a hard disk drive, and the like, for example. The storage unit 52 stores therein a program and the like that are executed by the processor 50. Further, the storage unit 52 according to the present embodiment secures a region for the frame buffer in which the image is drawn by the GPU.

The communication unit 54 is a communication interface such as a wireless LAN module, for example.

The input/output unit 56 corresponds to input/output ports such as an HDMI (registered trademark) port and a USB port.

The relay device 16 according to the present embodiment is a computer including control units such as a control circuit, an image processing circuit, and an audio processing circuit, storage units such as a memory, and other components, for example. The relay device 16 relays the video signals and the audio signals that are output from the entertainment device 14 and outputs them to the HMD 12 and the display 18.

The display 18 according to the present embodiment is, for example, a liquid crystal display or the like, and displays videos and the like that are represented by the video signals output from the entertainment device 14.

The camera/microphone unit 20 according to the present embodiment includes cameras 20a that, for example, output images obtained by shooting subjects to the entertainment device 14, and microphones 20b that acquire surrounding audios, convert the acquired audios into audio data, and output the converted audio data. Further, the cameras 20a according to the present embodiment correspond to a stereo camera.

The HMD 12 and the relay device 16 are configured to be capable of transmitting/receiving data to/from each other via, for example, a wireless link. Here, the HMD 12 and the relay device 16 may be coupled to each other via a wired link using an HMDI cable, a USB cable, or the like. The entertainment device 14 and the relay device 16 are coupled to each other via, for example, an HMDI cable, a USB cable, or the like. The relay device 16 and the display 18 are coupled to each other via, for example, an HDMI cable or the like. The entertainment device 14 and the camera/microphone unit 20 are coupled to each other via, for example, an AUX (Auxiliary) cable or the like.

Each of the controllers 22 according to the present embodiment is an operation input device used for performing an operation input to the entertainment device 14. The entertainment system 10 according to the present embodiment includes two controllers 22. Further, each of the controllers 22 includes a plurality of buttons. A user is able to, in a state of grasping the controllers 22 with individual left and right hands, make various operation inputs using the controllers 22 by pushing the buttons included in each of the controllers 22 and changing the positions and postures of the controllers 22.

Further, in the present embodiment, each of the controllers 22 outputs input data associated with an operation input, to the entertainment device 14. Each of the controllers 22 according to the present embodiment includes a wireless communication module or the like, and is configured to be capable of transmitting the input data to the communication unit 54 of the entertainment device 14 via a wireless link.

Further, each of the controllers 22 according to the present embodiment may include sensors such as an acceleration sensor and a motion sensor, for example. Further, the sensors may output input data representing measurement results such as a posture, a rotation amount, and a movement amount of each of the controllers 22 to the entertainment device 14 or the HMD 12 at a predetermined sampling rate. The input data having been received by the HMD 12 may be used in processing performed by the processor 30 of the HMD 12. Further, the input data having been received by the HMD 12 may be transmitted to the entertainment device 14 together with data representing the measurement results having been output from the sensor unit 40 of the HMD 12. Further, the processor 50 of the entertainment device 14 may perform processing that uses the input data and the data representing the measurement results.

In the present embodiment, the specification of the positions of the controllers 22 is made. Here, in the present embodiment, the specification of the positions of the controllers 22 may be made by means of tracking employing what is called an outside-in method. For example, the cameras 20a equipped in the camera/microphone unit 20 may output images having been obtained by shooting the controllers 22 to the entertainment device 14 at a predetermined sampling rate. Further, the entertainment device 14 may specify the positions of the controllers 22 on the basis of the images having been obtained by shooting the controllers 22.

Further, in the present embodiment, the positions of the controllers 22 may be specified by means of tracking employing what is called an inside-out method. Here, for example, the sensor unit 40 of the HMD 12 may further include a plurality of cameras. Further, the plurality of cameras may generate images having been obtained by shooting the controllers 22 operated by the user, at a predetermined sampling rate. Further, the relative positions of the controllers 22 with respect to the HMD 12 may be calculated from the images having been obtained by shooting the controllers 22. Further, the entertainment device 14 may specify the absolute positions of the controllers 22 on the basis of the position and the direction of the HMD 12, which are measured by the sensor unit 40, and the calculated relative positions.

Note that the specification of the positions of the controllers 22 may be made, not by the entertainment device 14, but by the HMD 12 or the relay device 16.

Further, each of the controllers 22 may include a light emitting member such as an LED (Light-Emitting Diode). Further, the specification of the position and the direction of each of the controllers 22 may be made on the basis of images that the cameras 20a and the cameras equipped in the HMD 12 have obtained by shooting the light emitting member.

Figure 3:
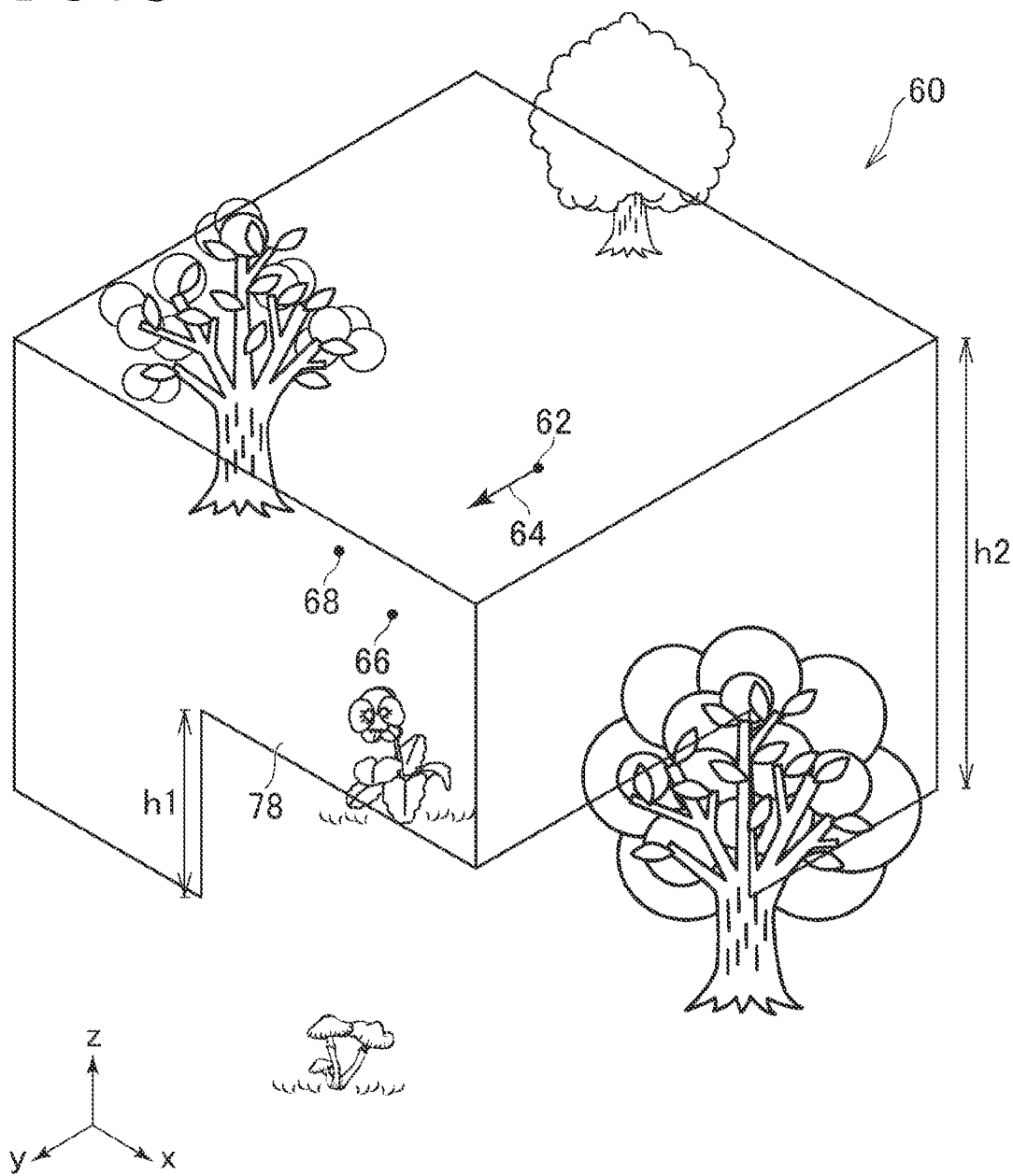
FIG. 3 is a diagram illustrating an example of a virtual space according to the embodiment of the present invention.

In the present embodiment, for example, a moving image is generated which represents a condition as viewed in a line-of-sight direction 64 from a point of view 62, which is arranged in a virtual space 60 illustrated in FIG. 3. Here, for example, a frame image is generated at a predetermined frame rate. Further, the virtual space 60 illustrated in FIG. 3 is a virtual three-dimensional space. In addition, the moving image may be generated according to, for example, the execution of a program for a first person point-of-view game using a VR technology in the entertainment device 14. Further, the VR technology in the present embodiment may be a room-scale VR technology that enables a user to, by walking around with the HMD 12 worn, experience a feeling as if the user were moving in the virtual space 60.

The position of the point of view 62 and the line-of-sight direction 64 change according to play statuses of a game, such as operations of the controllers 22 by the user and events that occur in the game, for example. Further, the position of the point of view 62 and the line-of-sight direction 64 change according to, for example, the changes of the position and posture of the HMD 12. Further, the content displayed on the display unit 38 of the HMD 12 changes according to the changes of the position of the point of view 62 and the line-of-sight direction 64. Processing according to the play statuses of the game and including the updating of the position of the point of view 62 and the line-of-sight direction 64, the generation of a frame image, and the display of the frame image may be performed at the above-mentioned predetermined frame rate.

Further, the position of a left hand corresponding point 66 associated with the position of the left hand of the user changes according to user's operations of the controller 22 that the user holds with his or her left hand or the changes of the position and posture of the controller 22. Further, the position of a right hand corresponding point 68 associated with the position of the right hand of the user changes according to user's operations of the controller 22 that the user holds with his or her right hand or the changes of the position and posture of the controller 22.

Figure 4:
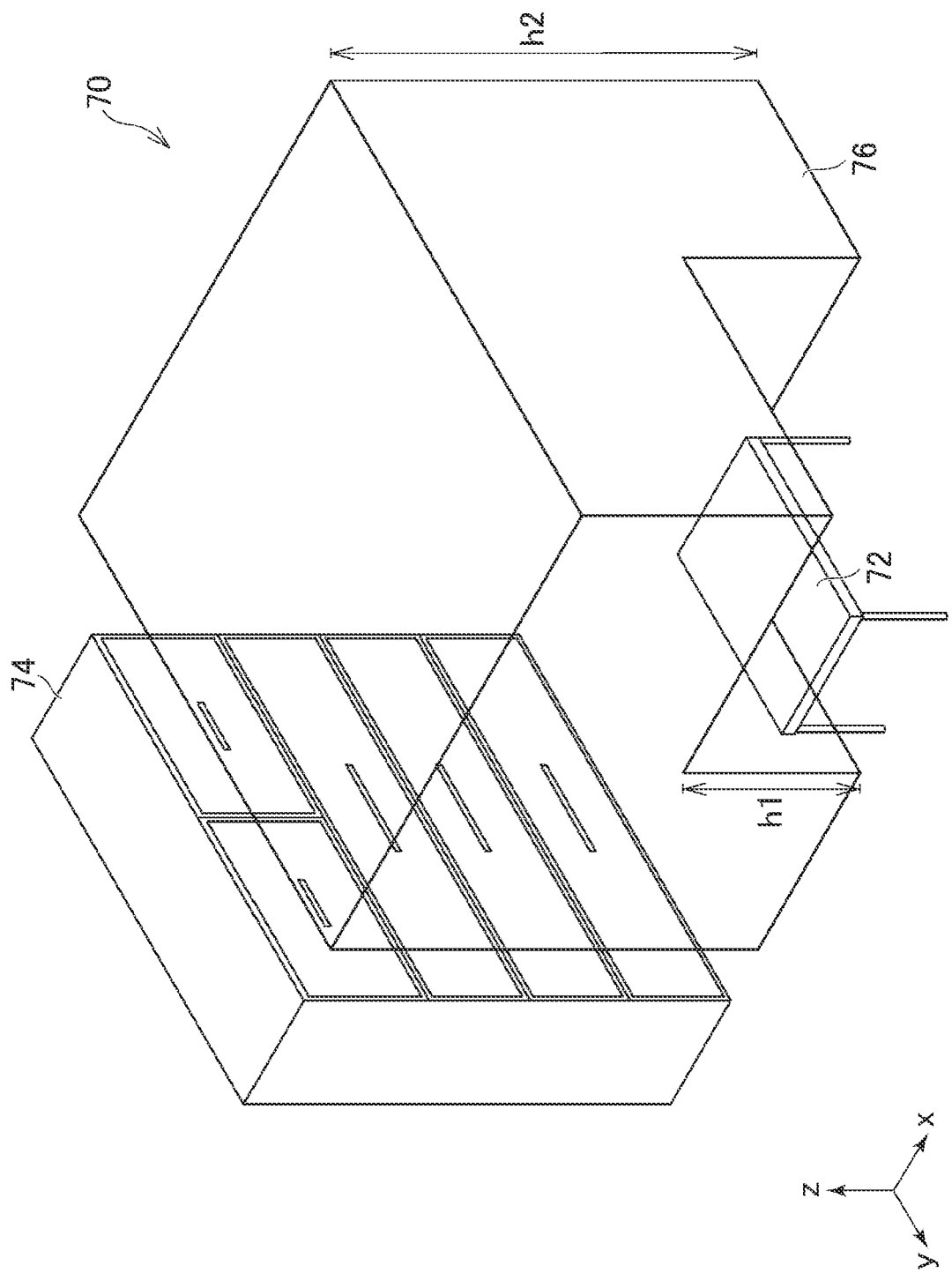
FIG. 4 is a diagram schematically illustrating an example of a real space according to the embodiment of the present invention.

FIG. 4 is a diagram schematically illustrating an example of a real space 70 associated with the virtual space 60 illustrated in FIG. 3. In the present embodiment, positions in the virtual space 60 illustrated in FIG. 3 are associated with positions in the real space 70 illustrated in FIG. 4 on a one-to-one basis.

The position of the head of the user wearing the HMD 12 inside the real space 70 is associated with the position of the point of view 62 inside the virtual space 60. Further, the direction of the head of the user wearing the HMD 12 inside the real space 70 is associated with the line-of-sight direction 64 inside the virtual space 60. Further, the position inside the real space 70 with respect to the controller 22 that the user wearing the HMD 12 holds with his or her left hand is associated with the position of the left hand corresponding point 66 inside the virtual space 60. Further, the position inside the real space 70 with respect to the controller 22 that the user wearing the HMD 12 holds with his or her right hand is associated with the position of the right hand corresponding point 68 inside the virtual space 60.

Here, the position and direction of the head of the user wearing the HMD 12 inside the real space 70 may be specified on the basis of, for example, the results of measurements by the sensor unit 40. Further, the position of each of the controllers 22 inside the real space 70 may be specified on the basis of the results of measurements by the sensors equipped in each of the controllers 22.

Further, the position and direction of the head of the user wearing the HMD 12 inside the real space 70 and the positions of the controllers 22 may be specified on the basis of, for example, images having been shot by the cameras 20a equipped in the camera/microphone unit 20. Alternatively, the position and direction of the head of the user wearing the HMD 12 inside the real space 70 and the positions of the controllers 22 may be specified on the basis of images having been shot by the plurality of camaras included in the sensor unit 40 of the HMD 12. In this case, the specification of the positions of the controllers 22 may be made by using an object recognition algorism executed by the HMD 12, the entertainment device 14, or the relay device 16.

In the VR technology, when the condition of the virtual space 60 is being displayed on the display unit 38, in general, the user wearing the HMD 12 is unable to visually recognize the condition of the real space 70. Thus, a technology which maintains the immersive feeling of the user wearing the HMD 12 with the display unit 38 displaying the condition of the virtual space 60 and which simultaneously therewith prevents the user from coming into contact with objects of the real space 70, such as a table 72 and a cabinet 74 that are arranged on the floor, and a wall is important.

Based on this, the present embodiment has been configured to make it possible to set a boundary surface 76 for delimiting a region which is located inside the real space 70 and in which the user is permitted to exist and a region which is located inside the real space 70 and in which the user is not permitted to exist. Hereinafter, the region which is located inside the real space 70 and in which the user is permitted to exist will be referred to as a permissible region. Further, the region which is located inside the real space 70 and in which the user is not permitted to exist will be referred to as an impermissible region. It follows that the user plays, for example, a first person point-of-view game, in the permissible region.

Further, in the present embodiment, a virtual object representing the boundary surface 76 that is set in the real space 70 is arranged inside the virtual space 60, as illustrated in FIG. 3. Hereinafter, the virtual object will be referred to as a boundary surface object 78. In the present embodiment, for example, the boundary surface object 78 is arranged at a position located inside the virtual space 60 and associated with a position at which the boundary surface 76 has been set in the real space 70. For example, grid pattern textures each composed of a plurality of lines extending in the height direction and a plurality of lines extending in the horizontal direction may be attached to the insides of polygons included in the boundary surface object 78.

Further, when the user wearing the HMD 12 has approached the boundary surface 76 having been set, part or the whole of the boundary surface object 78 is displayed on the display unit 38 equipped in the HMD 12. Here, for example, in the case where a distance from the boundary surface object 78 to any one of the point of view 62, the left hand corresponding point 66, and the right hand corresponding point 68 is equal to or shorter than a predetermined distance, part or the whole of the boundary surface object 78 may be displayed.

In this way, the entertainment system 10 according to the present embodiment makes it possible to notify the user wearing the HMD 12 of a situation in which the user has approached the boundary surface 76, and consequently prevent the user from going out of the permissible region.

Here, setting a region in which no object is arranged to the permissible region makes it possible to prevent the user wearing the HMD 12 from coming into contact with the objects of the real space 70.

Further, the present embodiment has been configured such that, as illustrated in FIG. 4, the boundary surface 76 whose boundary lines differ according to the height can be set. In the example of FIG. 4, for a range whose height from the floor is lower than h1, a boundary surface 76 is set so as to avoid the table 72. Further, for a range whose height from the floor is higher than h1 but lower than h2, a boundary surface 76 is set to define a permissible region larger than that of the range whose height from the floor is lower than h1.

Figure 5:
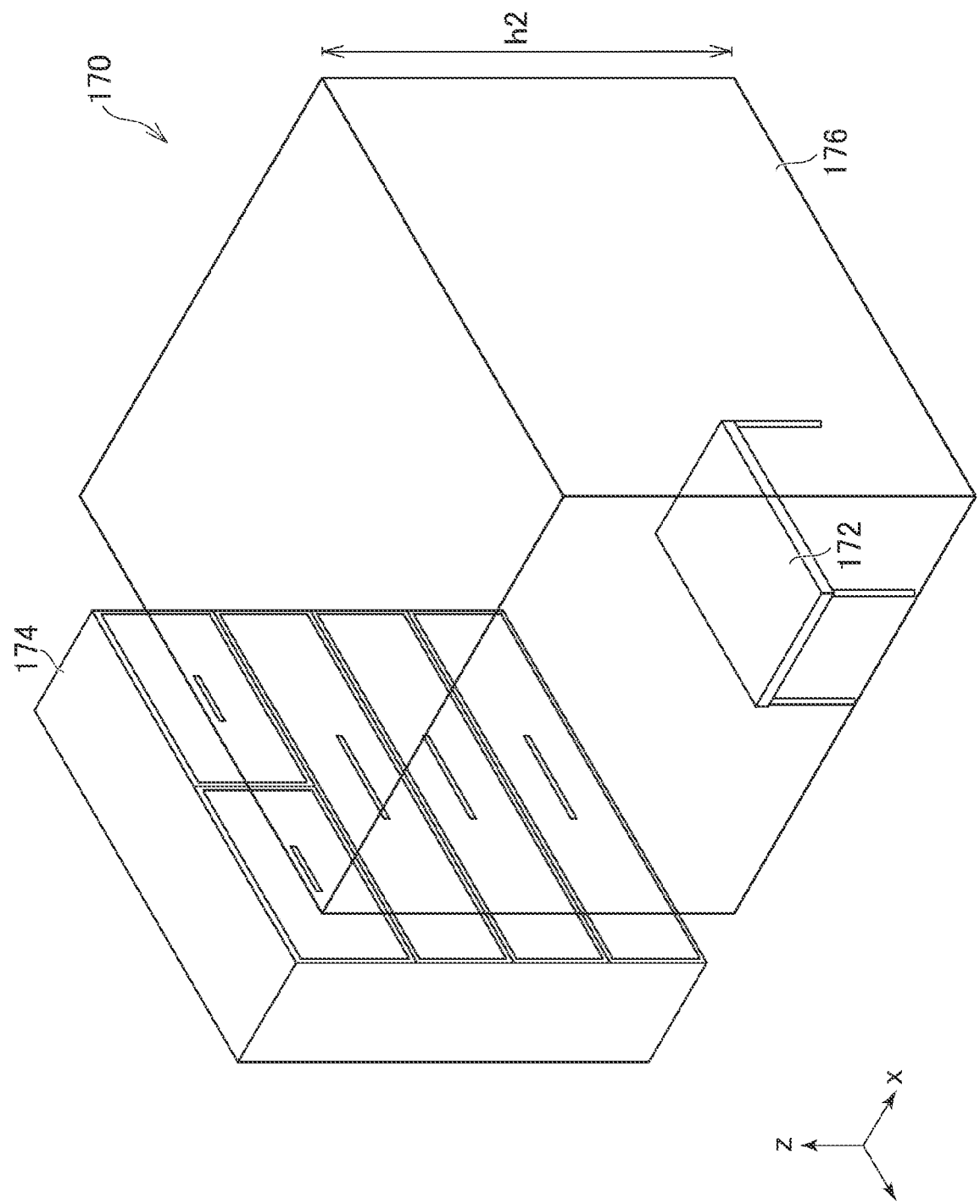
FIG. 5 is a diagram schematically illustrating an example of a real space according to a first comparison example.
Figure 6:
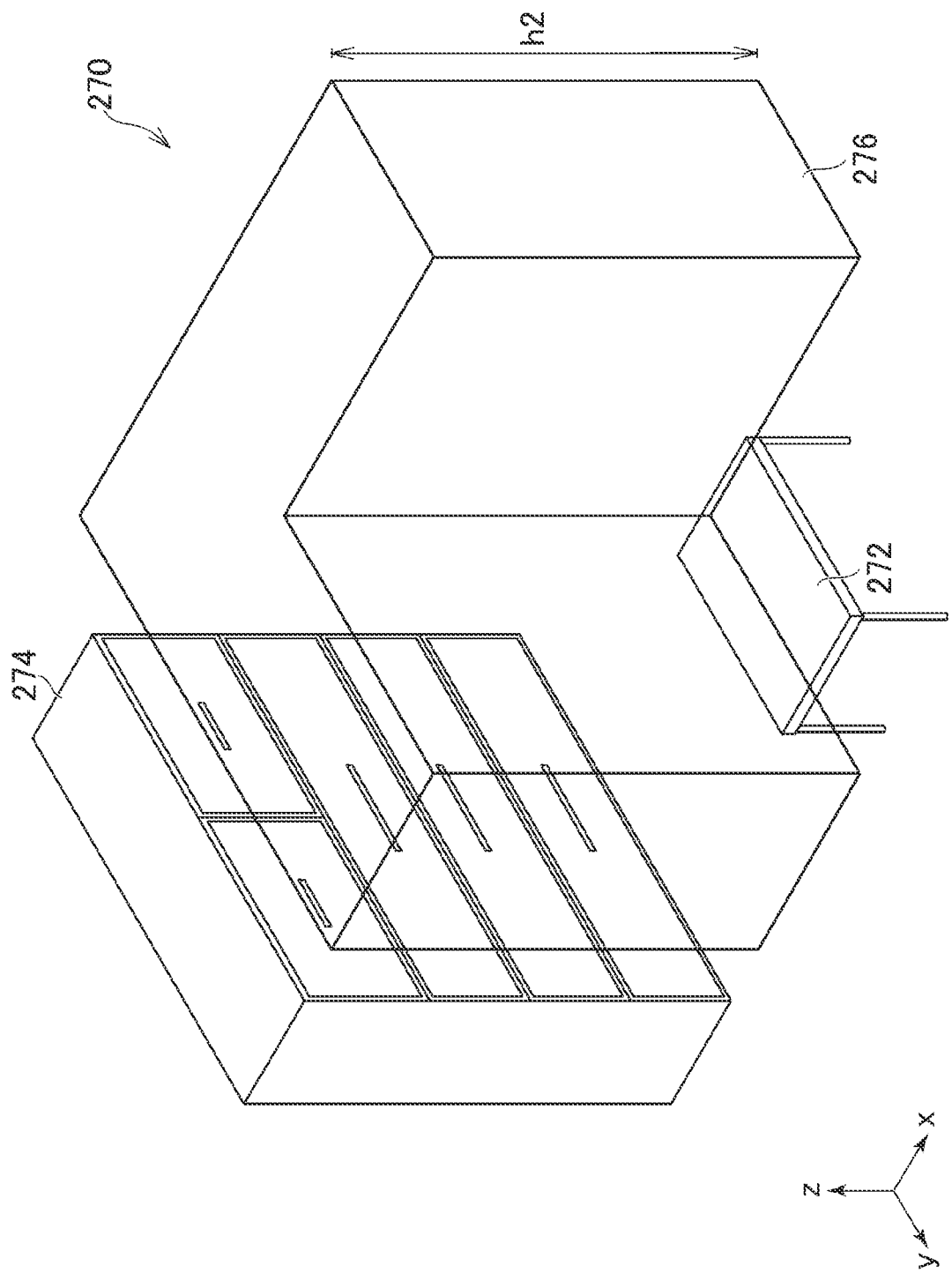
FIG. 6 is a diagram schematically illustrating an example of a real space according to a second comparison example.

FIG. 5 illustrates an example of a real space 170 in a first comparison example, in which a table 172 and a cabinet 174 are arranged and a boundary surface 176 is set. FIG. 6 illustrates an example of a real space 270 in a second comparison example, in which a table 272 and a cabinet 274 are arranged and a boundary surface 276 is set.

In the example of FIG. 5, the boundary surface 176 similar to a boundary surface 76 that is illustrated in FIG. 4 and that falls within the region whose height from the floor is higher than h1 but lower than h2 is set independent of the height. For this reason, it follows that, for the range whose height from the floor is lower than h1, the table 172 is included in the permissible region. Here, in order that the table 172 is not included in the permissible region, it is necessary to move the table 172 out of the permissible region.

In the example of FIG. 6, the boundary surface 276 similar to a boundary surface 76 that is illustrated in FIG. 4 and that falls within the range whose height from the floor is lower than h1 is set independent of the height. In this case, the table 272 is not included in the permissible region, but it follows that, for the range whose height from the floor is higher than h1 but lower than h2, the permissible region is smaller than that in the example of FIG. 4.

In the present embodiment, as illustrated in FIG. 4, the boundary surface 76 can be more flexibly set than in the examples of FIGS. 5 and 6. Thus, the present embodiment makes it possible to cause no object to be included in the permissible region and simultaneously therewith secure the permissible region having a largeness of a certain degree.

Hereinafter, focusing on the setting of the boundary surface 76, functions implemented by the entertainment device 14 according to the present embodiment and processing performed by the entertainment device 14 according to the present embodiment will be further described.

Figure 7:
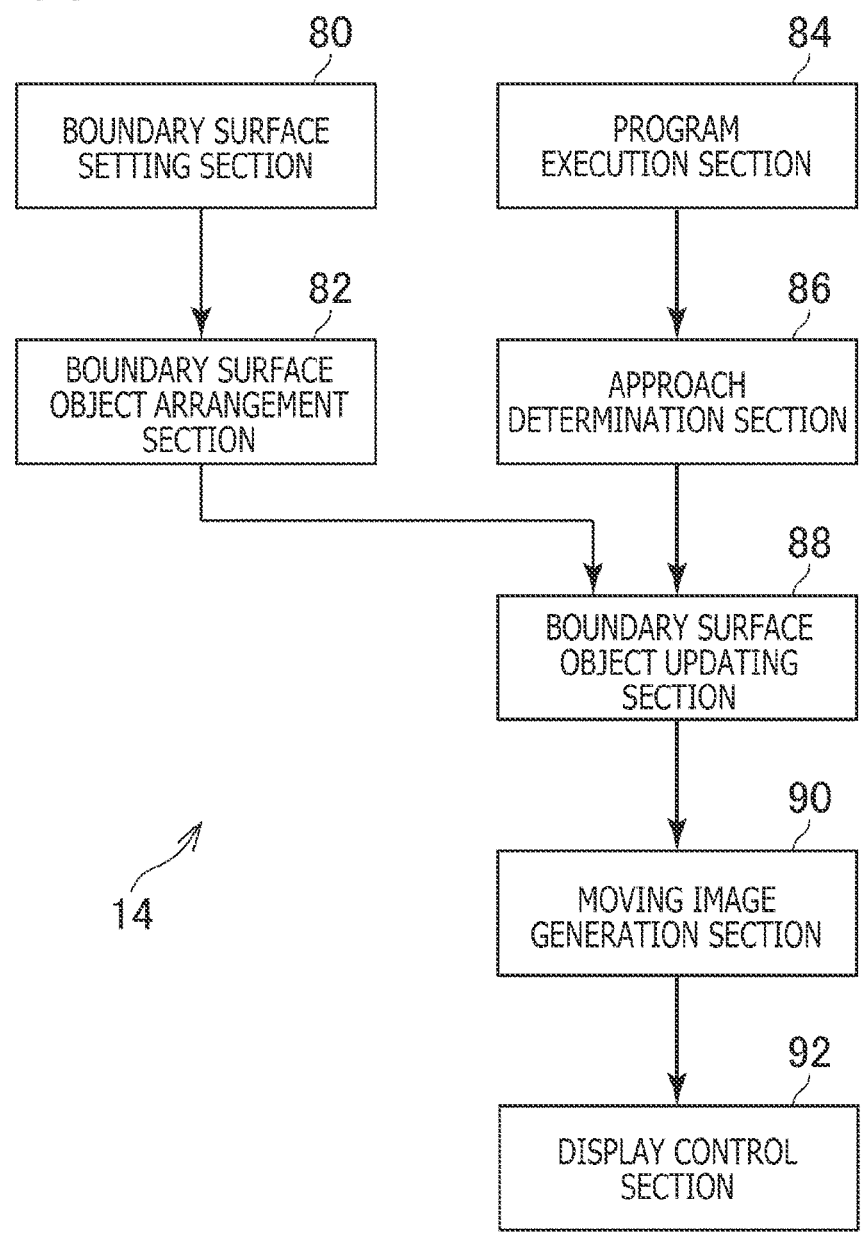
FIG. 7 is a function block diagram illustrating an example of functions implemented by the entertainment device according to the embodiment of the present invention.

FIG. 7 is a function block diagram illustrating an example of functions implemented by the entertainment device 14 according to the present embodiment. Note that the entertainment device 14 according to the present embodiment does not need to implement all functions illustrated in FIG. 7, and further, may implement functions other than the functions illustrated in FIG. 7.

As illustrated in FIG. 7, the entertainment device 14 according to the present embodiment functionally includes, for example, a boundary surface setting section 80, a boundary surface object arrangement section 82, a program execution section 84, an approach determination section 86, a boundary surface object updating section 88, a moving image generation section 90, and a display control section 92.

The boundary surface setting section 80 and the program execution section 84 are mainly implemented by the processor 50 and the communication unit 54. The boundary surface object arrangement section 82, the approach determination section 86, the boundary surface object updating section 88, and the moving image generation section 90 are mainly implemented by the processor 50. The display control section 92 is mainly implemented by the processor 50 and the input/output unit 56.

Further, the above functions are implemented by causing the processor 50 to execute a program that is installed in the entertainment device 14, which is a computer, and that includes instruction groups corresponding to the above functions. The program is supplied to the entertainment device 14 via a computer-readable information storage medium, such as an optical disk, a magnetic disk, a magnetic tape, a magneto-optical disk, or a flash memory, or via the internet or the like, for example.

In the present embodiment, the boundary surface setting section 80, for example, sets the boundary surface 76 for delimiting the above-described permissible region and the above-described impermissible region. Here, as described above, the boundary surface setting section 80 may set the boundary surface 76 including a first boundary line having a first height and a second boundary line having a second height. Here, a portion or all of the first boundary line may be different from the second boundary line.

Further, the boundary surface setting section 80 may set the boundary surface 76 according to a series of operations by the user wearing the HMD 12 (for example, a series of operations of the controllers 22 by the user). Hereinafter, the series of operations will be referred to as a series of boundary surface setting operations.

For example, an assumption is made that the user performs an operation of moving the controller 22 in a state of pushing a button equipped in the controller 22 with his or her finger, and then removes the finger from the button. In this case, an assumption is made that the position of the controller 22 is specified n times at a predetermined sampling rate over a period during which the button is being pushed. For example, an assumption is made that a set of three-dimensional coordinate values $(x_1, y_1, z_1)$, $(x_2, y_2, z_2), \ldots,$ and $(x_n, y_n, z_n)$ in the real space 70 is specified. Here, the average value of Z-axis values, that is, $(z_1+z_2+\ldots+z_n)/n$, is denoted by $z_m$. In this case, a line that connects $(x_1, y_1, z_m)$, $(x_2, y_2, z_m), \ldots, (x_n, y_n, z_m)$, and $(x_1, y_1, z_m)$ may be set.

Figure 8:
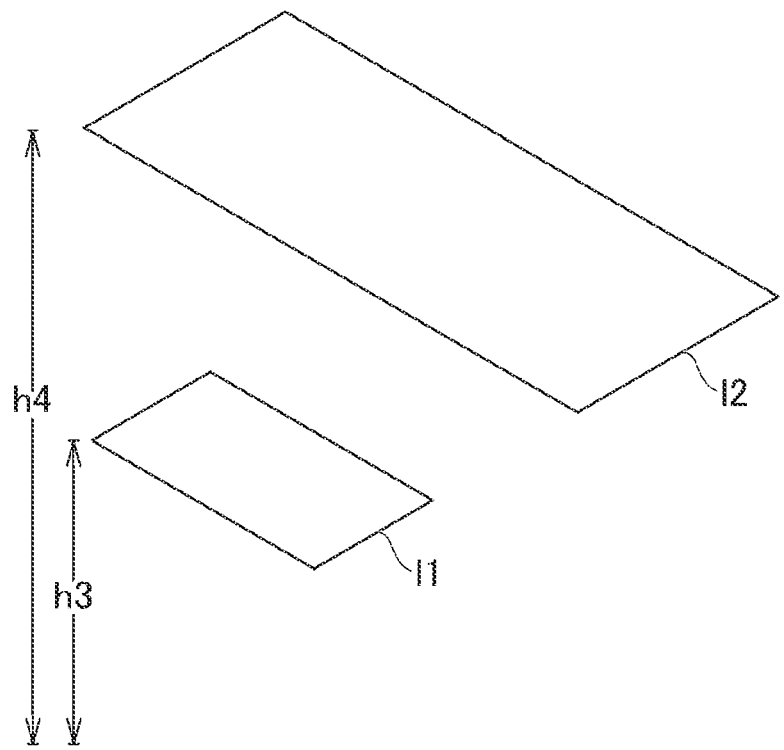
FIG. 8 is a diagram illustrating an example of settings of lines.

FIG. 8 illustrates lines 11 and lines 12 that are set by the series of boundary surface setting operations. Here, an assumption is made that the height from the floor with respect to the lines 11 having been set is h3, and the height from the floor with respect to the lines 12 having been set is h4. Further, as described above, the lines 11 and the lines 12 may be set on the basis of a trajectory of one of the sensors mounted in the controller 22 that the user moves inside the real space 70. Here, the order of a series of operations of setting the lines 11 and a series of operations of setting the lines 12 does not matter. Further, the method of setting the lines 11 and the lines 12 is not limited to the above-described method.

Further, in this case, the boundary surface setting section 80 may set a boundary surface 76 including the lines 11 and the lines 12.

Figure 9:
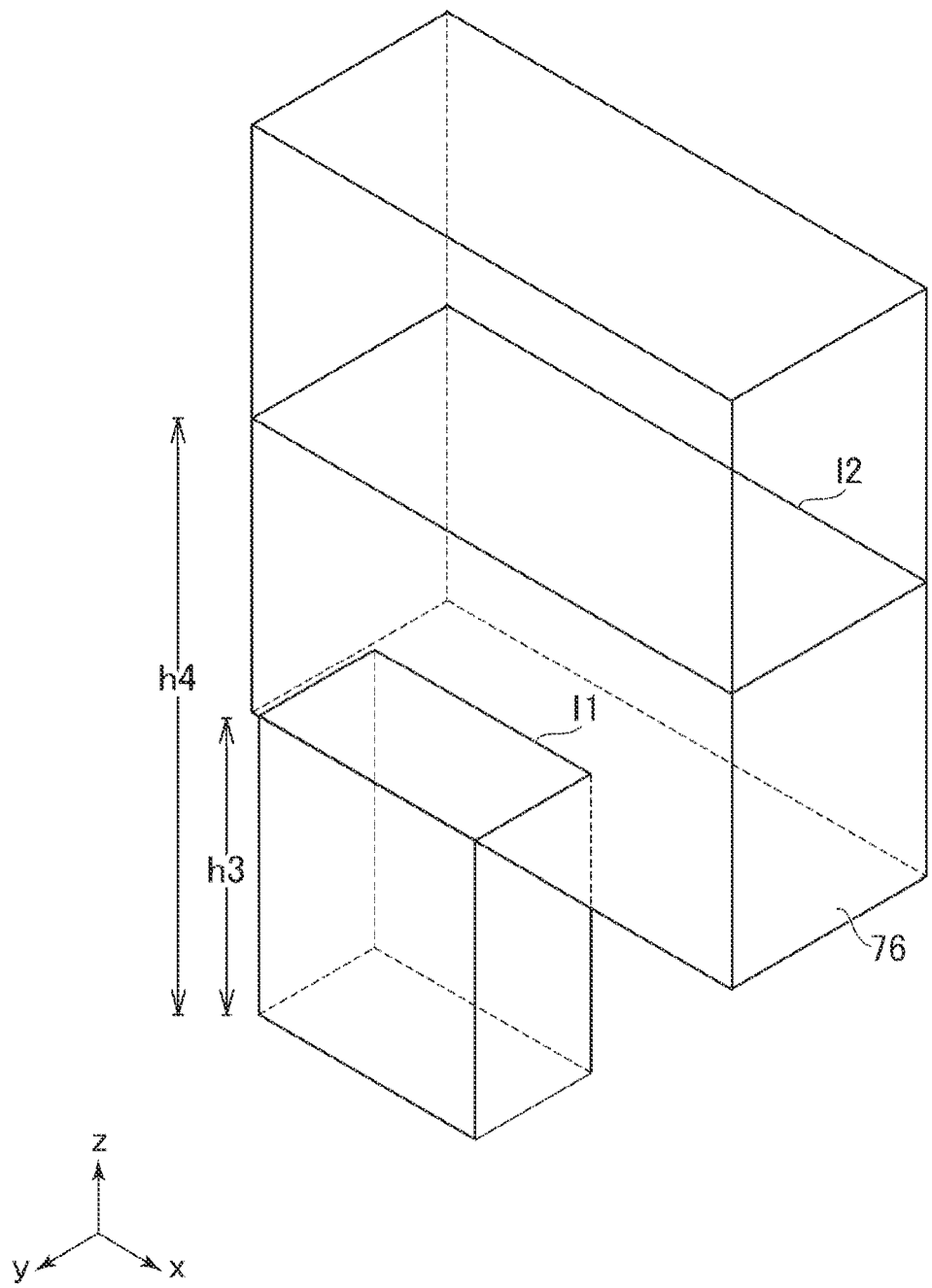
FIG. 9 is a diagram illustrating a boundary surface example.

For example, as illustrated in FIG. 9, for a range whose height from the floor is lower than h3, the boundary surface setting section 80 may set a boundary surface 76 including lines obtained by parallel-shifting of the lines 11 along a height direction toward the floor. Further, in this case, for a range whose height from the floor is higher than h3, the boundary surface setting section 80 may set a boundary surface 76 including lines obtained by parallel-shifting of the lines 12 along the height direction.

Figure 10:
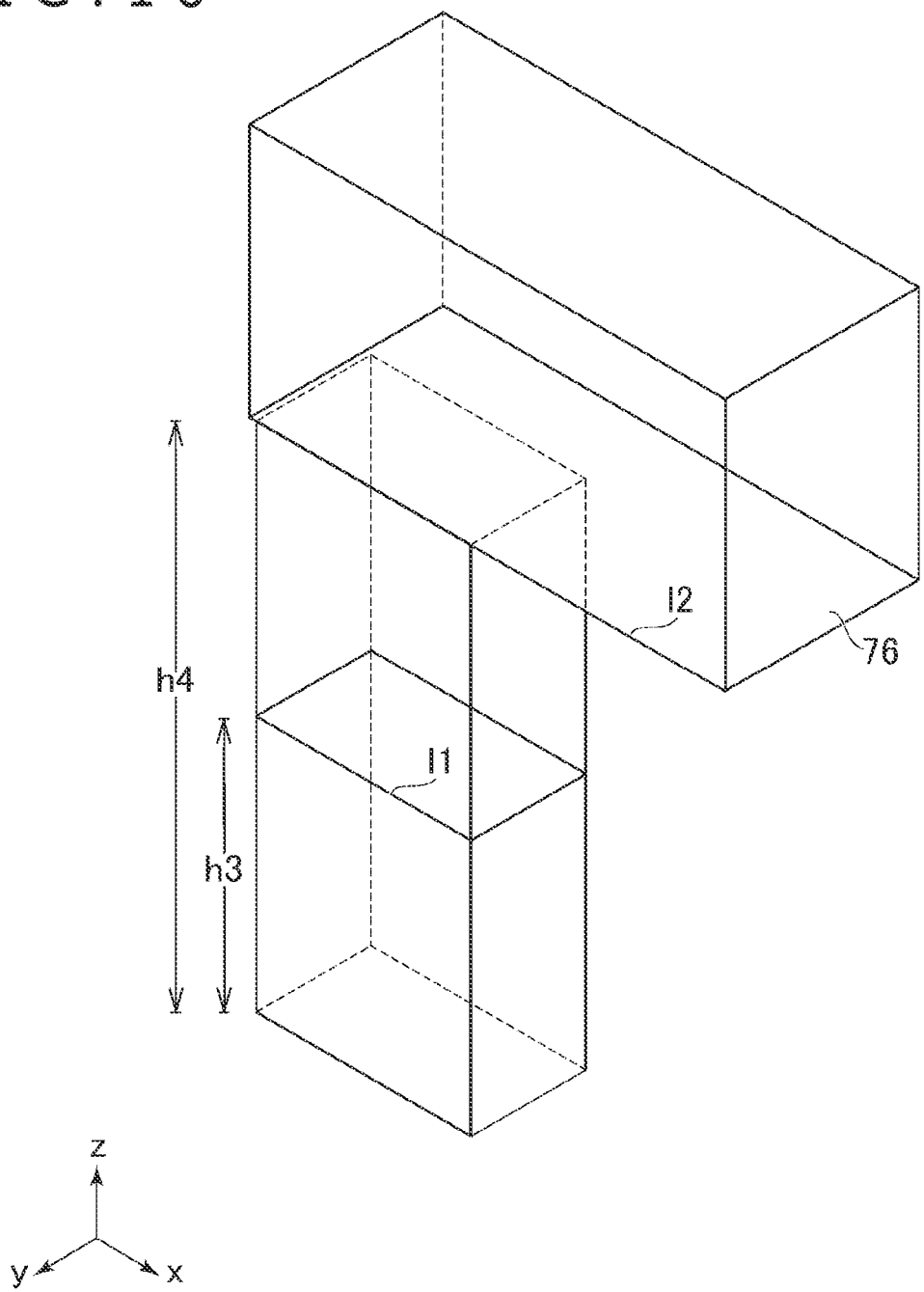
FIG. 10 is a diagram illustrating a boundary surface example.

Alternatively, as illustrated in FIG. 10, for a range whose height from the floor is lower than h4, the boundary surface setting section 80 may set a boundary surface 76 including lines obtained by parallel-shifting of the lines 11 along the height direction toward the floor and the height direction away from the floor. Further, in this case, for a range whose height from the floor is higher than h4, the boundary surface setting section 80 may set a boundary surface 76 including lines obtained by parallel-shifting of the lines 12 along the height direction away from the floor.

Figure 11:
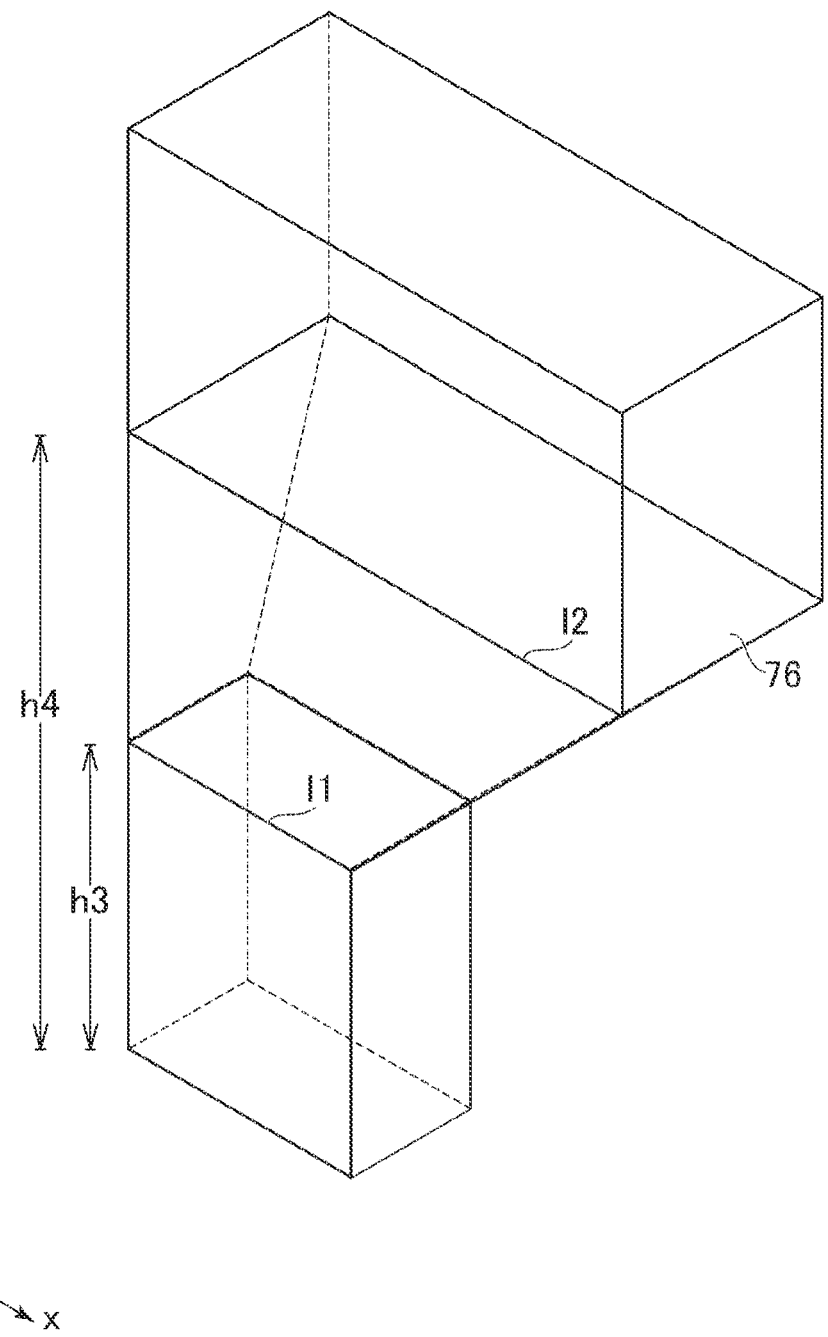
FIG. 11 is a diagram illustrating a boundary surface example.

Alternatively, as illustrated in FIG. 11, for a range whose height from the floor is lower than h3, the boundary surface setting section 80 may set a boundary surface 76 including lines obtained by parallel-shifting of the lines 11 along the height direction. Further, in this case, for a range whose height from the floor is higher than h4, the boundary surface setting section 80 may set a boundary surface 76 including lines obtained by parallel-shifting of the lines 12 along the height direction. Further, in this case, for a range whose height from the floor is higher than h3 and lower than h4, the boundary surface setting section may set a boundary surface 76 including lines formed by complementing the lines 11 and the lines 12.

In any one of the examples of FIGS. 9 to 11, it follows that, for a height lower than the height h3, a boundary surface 76 including boundary lines obtained by parallel-shifting of the lines 11 is set, and for a height higher than the height h4, a boundary surface including boundary lines obtained by parallel-shifting of the lines 12 is set.

Further, the series of boundary surface setting operations is not limited to the above-described series of operations of setting lines parallel to a horizontal plane (X-Y plane) in such a way as described above. For example, the series of boundary surface setting operations may be a series of operations of setting lines along the height directions (Z-axis directions). In this case, the boundary surface setting section 80 may set a boundary surface 76 including a plurality of lines along the height directions, which is set in such a way described above.

Further, according to an operation of setting a point located inside the real space 70, the boundary surface setting section 80 may set a boundary surface 76 that is a spherical surface having a center on the point. Further, according to an operation of setting a point located inside the real space 70 and a length, the boundary surface setting section 80 may set a boundary surface 76 that is a spherical surface having a center on the point and having a radius according to the length.

Figure 12:
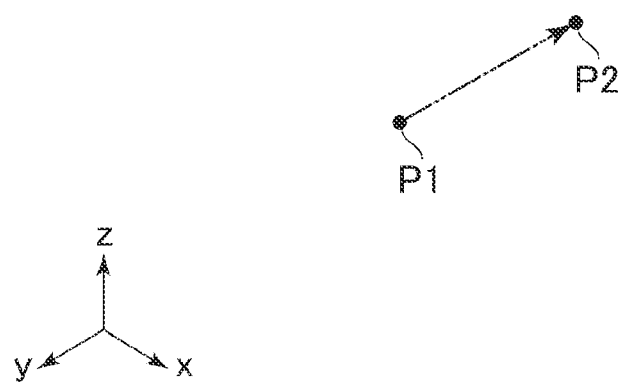
FIG. 12 is a diagram illustrating an example of settings of a point and a length.
Figure 13:
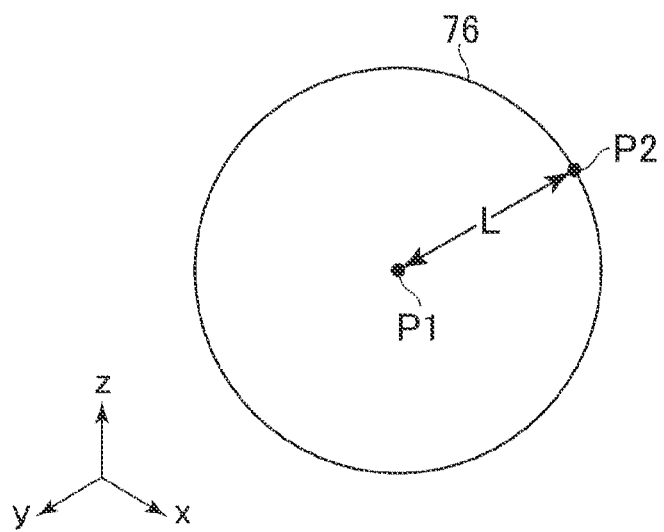
FIG. 13 is a diagram illustrating a boundary surface example.

For example, an assumption is made that, as illustrated in FIG. 12, the user has performed the following operations: an operation of pushing a button of the controller 22 lying at the position of a point P1 with his or her finger; an operation of moving the controller 22 to the position of a point P2 in a state of pushing the button; and an operation of removing the finger from the button. In this case, as illustrated in FIG. 13, a boundary surface 76 may be set to a spherical surface having a center on the point P1 and having a radius that is a length L between the point P1 and the point P2. The boundary surface 76 results in a surface passing through the point P2.

Note that the operations of setting the point P1 and the length L are not limited to the above operations. Further, not the operation of setting the radius but an operation of setting a diameter may be performed. Further, a boundary surface 76 that is a spherical surface having a center on the point P1 and having the above diameter may be set. In this case, the radius of the spherical surface is half the length of the diameter having been set.

Further, the boundary surface setting section 80 may set a boundary surface 76 circumscribing the trajectory of a sensor that the user moves inside the real space 70. For example, an assumption is made that the user freely moves the controller 22 with its button pushed with his or her finger inside the real space 70 and then the user removes the finger from the button. In this case, a boundary surface 76 circumscribing a trajectory of the controller 22 which is obtained by sequentially connecting the positions of the controller 22, each of which is specified at a predetermined sampling rate (for example, a boundary surface 76 that is projected hull of the trajectory), may be set.

Further, the boundary surface setting section 80 may set a boundary surface 76 that delimits a region that is a field-of-view range of a camera arranged in the real space 70 and a region that is not the field-of-view range. For example, a boundary that delimits a region that is a field-of-view range of the cameras 20a and a region that is not the field-of-view range may be set as a boundary surface 76.

Further, the boundary surface setting section 80 may specify an object arranged inside the real space 70, on the basis of the result of image recognition processing (object recognition processing) on images shot by the camera arranged in the real space 70. Here, the object arranged inside the real space 70 may be specified by using the cameras 20a or the cameras included in the sensor unit 40 of the HMD 12. Further, the boundary surface setting section 80 may set the boundary surface 76 such that a region occupied by the object is included in the impermissible region. Specifically, for example, regions occupied by the table 72 and the cabinet 74 in the real space 70 may be specified on the basis of the images shot by the cameras 20a. Further, as illustrated in FIG. 4, the boundary surface 76 may be set such that the specified regions are included in the impermissible region.

Figure 14:
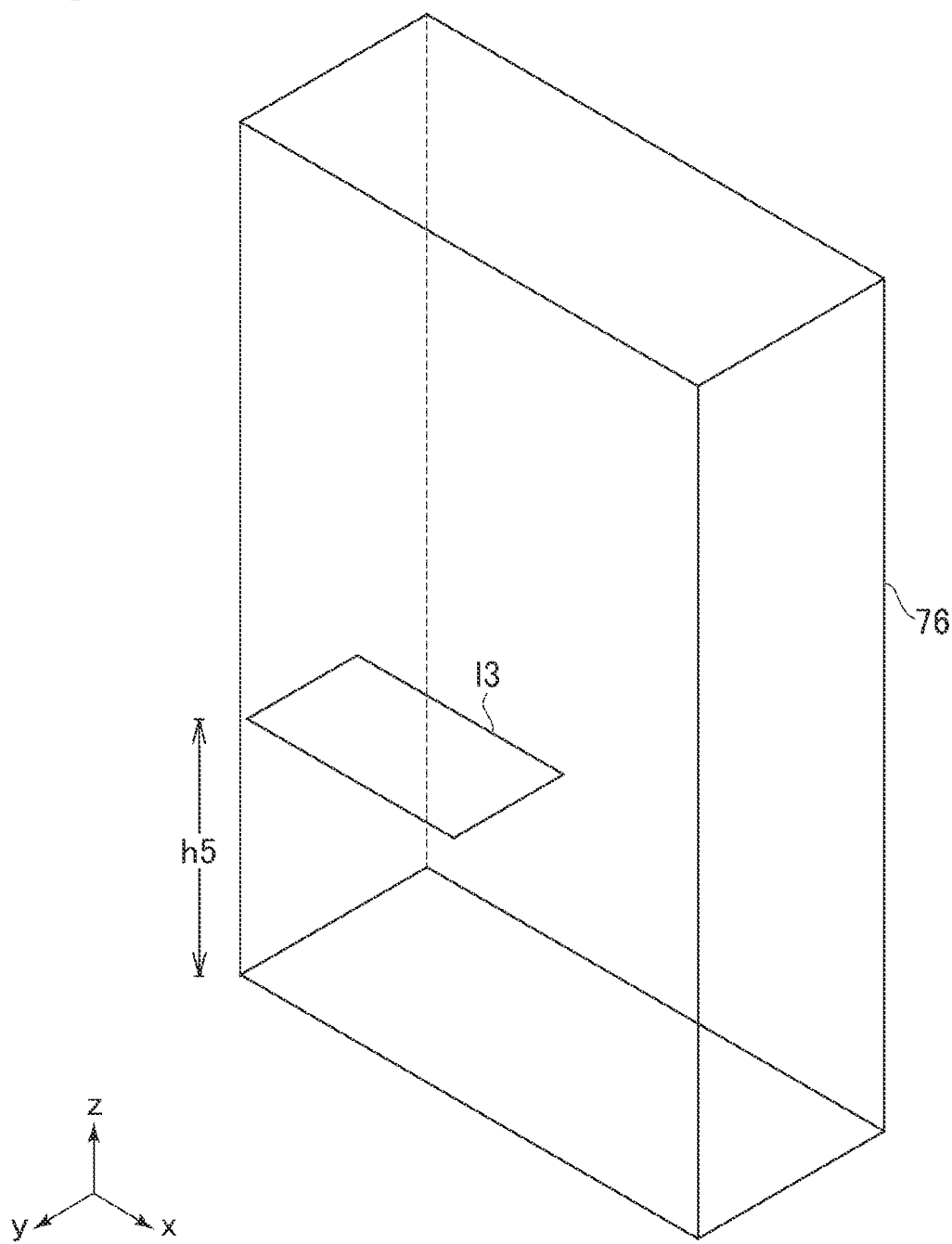
FIG. 14 is a diagram illustrating a boundary surface example.
Figure 15:
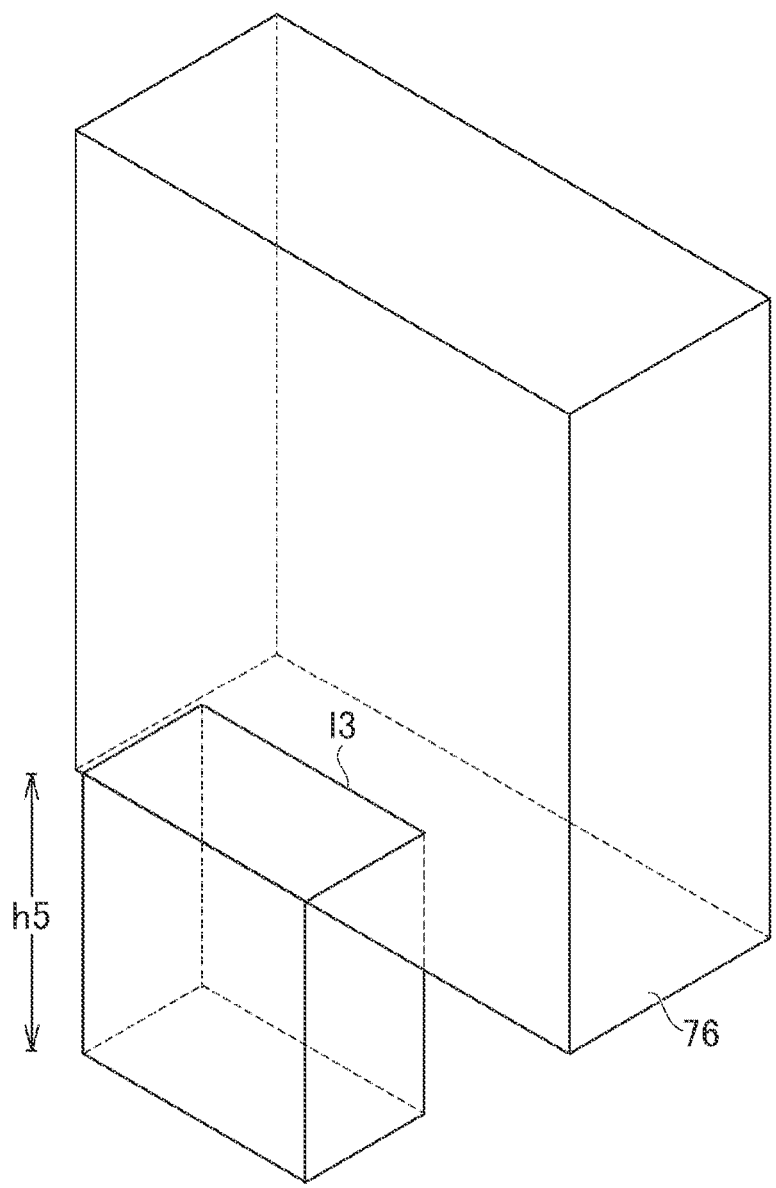
FIG. 15 is a diagram illustrating a boundary surface example.

Further, according to an operation by the user for setting a region located more inside than a boundary surface 76, the boundary surface setting section 80 may change the boundary surface 76 such that the region is included in the impermissible region. Here, according to an operation of setting a region that is in contact with a boundary surface 76 and is located more inside than the boundary surface 76, the boundary surface 76 may be changed such that the region is included in the impermissible region. For example, an assumption is made that, in a state in which a boundary surface 76 such as one illustrated in FIG. 14 is set, an operation of setting lines 13 whose heights from the floor are each h5 has been performed. In this case, as illustrated in FIG. 15, for a range whose height from the floor is lower than the heights of the lines 13, the boundary surface 76 may be changed so as to include lines obtained by parallel-shifting of the lines 13 in the height direction toward the floor. In this case, the operation of setting the lines 13 corresponds to the operation of setting a region that is in contact with the boundary surface 76 and is located more inside than the boundary surface 76. Note that the operation of setting the region located more inside than the boundary surface 76 is not limited to the above-described operation.

Figure 16:
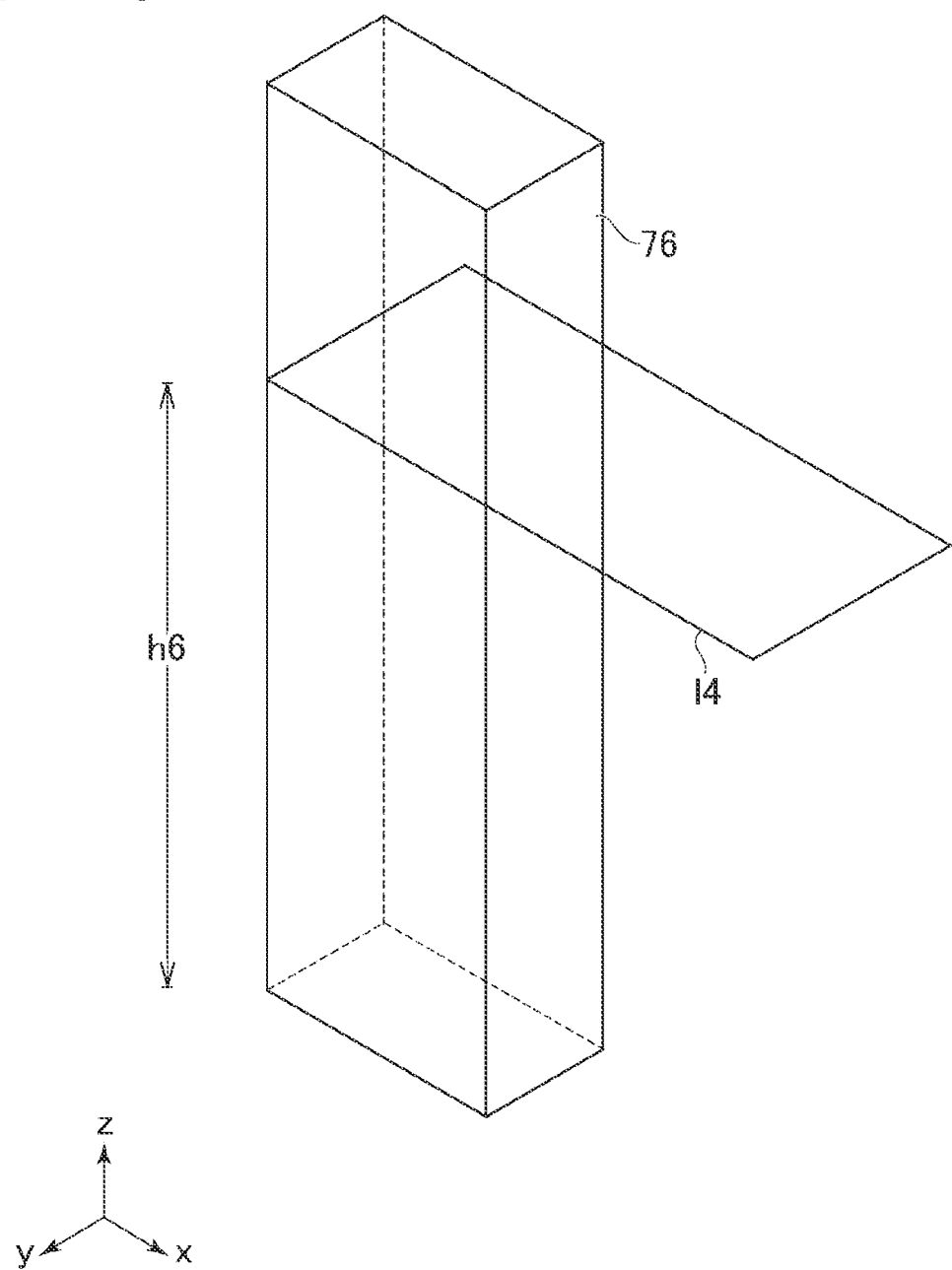
FIG. 16 is a diagram illustrating a boundary surface example.
Figure 17:
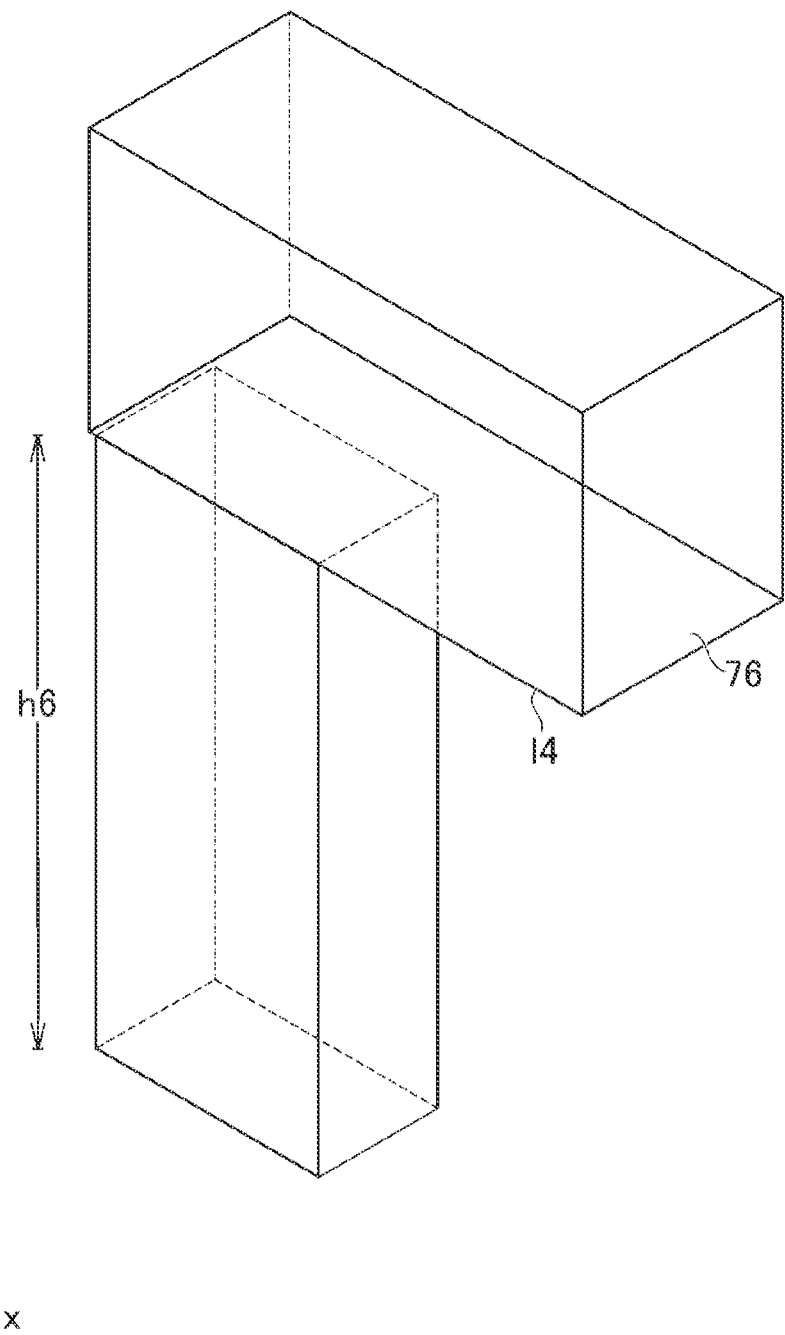
FIG. 17 is a diagram illustrating a boundary surface example.

Further, according to an operation by the user for setting a region located more outside than a boundary surface 76, the boundary surface setting section 80 may change the boundary surface 76 such that the region is included in the permissible region. Here, according to an operation of setting a region that is in contact with a boundary surface 76 and is located more outside than the boundary surface 76, the boundary surface 76 may be changed such that the region is included in the permissible region. For example, an assumption is made that, in a state in which a boundary surface 76 such as one illustrated in FIG. 16 is set, an operation of setting lines 14 whose heights from the floor are each h6 has been performed. In this case, as illustrated in FIG. 17, for a range whose height from the floor is higher than h6, the boundary surface 76 may be changed so as to include lines obtained by parallel-shifting of the lines 14 in the height direction away from the floor. In this case, the operation of setting the lines 14 corresponds to the operation of setting a region that is in contact with the boundary surface 76 and is located more outside than the boundary surface 76. Note that the operation of setting the region located more outside than the boundary surface 76 is not limited to the above-described operation.

Further, the boundary surface setting section 80 may generate boundary surface data representing the boundary surface 76. The boundary surface data may include, for example, three-dimensional coordinate values inside the real space 70 with respect to each of a plurality of points on the boundary surface 76. Further, the data structure of the boundary surface data may be a data structure of a polygon model.

Further, the boundary surface setting section 80 may be configured to, when the user is performing the series of boundary surface setting operations, cause the boundary surface 76, lines set by the user, and the like to be displayed on the display 18. Here, for example, the boundary surface setting section 80 may perform AR (Augmented Reality) display for allowing the image of lines set by the user, such as the lines 11 and the lines 12 illustrated in FIG. 8, and the image of a set boundary surface 76 to be superimposed on images of the real space 70, which are shot by the cameras 20a.

Further, the boundary surface setting section 80 may perform display control for shifting/rotating a displayed image of the above-described lines and a displayed image of the boundary surfaces 76, according to operations by the user.

Further, the boundary surface setting section 80 may set a boundary surface 76 at the time of an initial setting, on the basis of the result of image recognition processing (object recognition processing). Further, the boundary surface setting section 80 may present, to the user, the boundary surface 76 at the time of the initial setting. For example, the boundary surface setting section 80 may be configured to allow the boundary surface 76 at the time of the initial setting to be displayed on the display 18. Further, thereafter, according to operations by the user wearing the HMD 12 (for, example, operations of the controllers 22 by the user), the boundary surface 76 at the time of the initial setting may be changed. In this way, it follows that the user is able to freely customize the boundary surface 76 at the time of the initial setting.

In addition, the configuration may be made such that the change of the boundary surface 76 by the user is not made and the boundary surface 76 at the time of the initial setting is used as it is. It is deemed that such a configuration can be achieved when the accuracy of the object recognition is further enhanced.

In the present embodiment, the boundary surface object arrangement section 82, for example, arranges, inside the virtual space 60, a boundary surface object 78 associated with the boundary surface 76 set by the boundary surface setting section 80. Here, the boundary surface object 78 may be, for example, a polygon model associated with the boundary surface 76. Further, as described above, the grid pattern textures may be attached to the insides of polygons included in the boundary surface object 78.

In the present embodiment, the program execution section 84, for example, executes programs such as a program for a first person point-of-view game. Further, the program execution section 84 may determine the position of the point of view 62 and the line-of-sight direction 64 at a predetermined sampling rate on the basis of the position and the direction of the HMD 12 that are measured by the sensor unit 40. Further, the program execution section 84 may determine the positions of the left hand corresponding point 66 and the right hand corresponding point 68 at a predetermined sampling rate on the basis of the positions of the controllers 22, which are measured by the sensors equipped in the controllers 22.

In the present embodiment, the approach determination section 86, for example, determines the approach of the user to the boundary surface 76. The approach determination section 86 may determine whether or not the user has approached the boundary surface 76, on the basis of, for example, a distance to the boundary surface 76 from the sensor unit 40 of the HMD 12 or the sensors equipped in the controllers 22. For example, as described above, in the case where a distance from the boundary surface object 78 to any one of the point of view 62, the left hand corresponding point 66, and the right hand corresponding point 68 is equal to or shorter than a predetermined distance, it may be determined that the user has approached the boundary surface 76.

Here, the determination regarding whether the user is approaching the boundary surface 76 is not limited to the above-described method. For example, in the case where distances from the boundary surface object 78 to any multiple points (for example, any two points) of the point of view 62, the left hand corresponding point 66, and the right hand corresponding point 68 are each equal to or shorter than a predetermined distance, it may be determined that the user has approached the boundary surface 76.

Further, for example, the approach determination section 86 may specify a region that is occupied by the body of the user inside the real space 70, on the basis of the result of the image recognition processing on the images shot by the cameras 20a. Further, the approach determination section 86 may determine whether or not the user has approached the boundary surface 76, on the basis of a distance between the contour of a region occupied by the body of the user and the boundary surface 76.

In the present embodiment, the boundary surface object updating section 88, for example, sets opacity (an alpha value) of the boundary surface object 78. Here, the opacity (alpha value) of the boundary surface object 78 may be set according to the approach of the user to the boundary surface 76, which is determined by the approach determination section 86. For example, in the case where the boundary surface object 78 is opaque (visible) and it is not determined that the user has approached the boundary surface 76, the boundary surface object 78 may be updated so as to be transparent (invisible). Further, for example, in the case where the boundary surface object 78 is transparent (invisible) and it is determined that the user has approached the boundary surface 76, the boundary surface object 78 may be updated so as to be opaque (visible).

Further, the approach determination section 86 may specify a distance to the boundary surface 76 from the sensor unit 40 of the HMD 12 or the sensors equipped in the controllers 22. Further, the boundary surface object updating section 88 may determine the opacity on the basis of the specified distance. The alpha value may be determined such that, for example, the shorter the specified distance is, the larger the alpha value is. Further, the boundary surface object updating section 88 may update the boundary surface object 78 such that the boundary surface object 78 has the determined alpha value.

In the present embodiment, the moving image generation section 90, for example, generates a moving image according to the result of the execution of a program by the program execution section 84, such as a moving image according to a play status of a game. Further, the moving image generation section 90 may generate a moving image representing a condition viewed in the line-of-sight direction 64 from the point of view 62, which is arranged inside the virtual space 60. Here, for example, a frame image may be generated at a predetermined frame rate. Further, in the case where part or the whole of the boundary surface object 78 is not transparent (invisible), the moving image generation section 90 may generate a frame image in which an image of the part or the whole of the boundary surface object 78 is superimposed on an image of the condition obtained by viewing the virtual space 60 in the line-of-sight direction 64 from the point of view 62.

In the present embodiment, the display control section 92, for example, causes a moving image representing the condition viewed in the line-of-sight direction 64 from the point of view 62, which is arranged inside the virtual space 60, to be displayed on the display unit 38. Here, for example, the display control section 92 may transmit the moving image to the HMD 12 via the relay device 16. Further, the HMD 12 may display the received moving image on the display unit 38.

Here, the display control section 92 may cause part or the whole of the boundary surface object 78, which is a virtual object representing the boundary surface 76, to be displayed on the display unit 38 of the HMD 12. For example, when it is determined by the approach determination section 86 that the user has approached the boundary surface 76, the display control section 92 may cause the part or the whole of the boundary surface object 78, which is a virtual object representing the boundary surface 76, to be displayed on the display unit 38 of the HMD 12. The display control section 92, for example, causes the moving image generated by the moving image generation section 90 to be displayed on the display unit 38. The display control section 92 may cause the frame image generated by the moving image generation section 90 to be displayed on the display unit 38 at a predetermined frame rate.

Here, an example of the flow of processing performed by the entertainment device 14 according to the present embodiment will be described referring to a flowchart illustrated as an example in FIG. 8. Pieces of processing illustrated in steps S101 to S105 illustrated in FIG. 18 are repeatedly performed at a predetermined frame rate. An assumption is made that, when the processing illustrated in the present processing example is started, the setting of the boundary surface 76 by the boundary surface setting section 80 and the arrangement of the boundary surface object 78 by the boundary surface object arrangement section 82 have already been made.

First, as described above, the program execution section 84 determines the position of the point of view 62, the line-of-sight direction 64, the position of the left hand corresponding point 66, and the position of the right hand corresponding point 68 (S101). The determination in the processing illustrated in S101 may be made on the basis of, for example, the position and the direction of the HMD 12, which are measured by the sensor unit 40 of the HMD 12, and the positions of the controllers 22, which are measured by the sensors equipped in the controllers 22.

Further, as described above, the approach determination section 86 determines the approach of the user to the boundary surface 76 on the basis of the position of the point of view 62, the position of the left hand corresponding point 66, and the position of the right hand corresponding point 68 which have been determined in the processing illustrated in S101 (S102).

Further, the boundary surface object updating section 88 sets the opacity (alpha value) of the boundary surface object 78 on the basis of the result of the determination in the processing illustrated in S102 (S103). Note that the opacity (alpha value) of the boundary surface object 78 is not necessarily required to be updated in the processing illustrated in S103.

Further, the moving image generation section 90 generates a frame image in the present frame (S104). Here, for example, a frame image is generated which represents a condition obtained by viewing the virtual space 60 in the line-of-sight direction 64 from the position of the point of view 62, which has been determined in the processing illustrated in S101. It follows that, in the case where the boundary surface object 78 is not transparent (invisible), an image of the boundary surface object 78 is included in the frame image.

Further, the display control section 92 causes the frame image having been generated in the processing illustrated in S104 to be displayed on the display unit 38 of the HMD 12 (S105), and the flow returns to the processing illustrated in S101.

Note that the present invention is not limited to the above-described embodiment.

Further, the sensor unit 40 of the HMD 12 includes the cameras, and in the case where the user performs the series of boundary surface setting operations in a state of wearing the HMD 12, the boundary surface 76, the lines set by the user, and the like may be displayed on the display unit 38 of the HMD 12. Further, in this case, the AR display may be performed for allowing the image of lines set by the user, such as the lines 11 and the lines 12 illustrated in FIG. 8, and the image of a set boundary surface 76 to be superimposed on images of the real space 70, which are shot by the cameras equipped in the HMD 12.

Further, the approach determination section 86 may determine that the user has excessively approached the boundary surface 76 or the user has moved to an impermissible region that is located outside the boundary surface 76. Further, in the case where such a determination has been made, images shot by the cameras equipped in the HMD 12 may be displayed on the display unit 38 of the HMD 12, and the execution of a program for a game may be suspended.

Further, the boundary surface setting section 80 may set a boundary surface 76 for delimiting a region that is a field-of-view range of the cameras equipped in the HMD 12 and a region that is not the field-of-view range. For example, a boundary for delimiting a region that is a field-of-view range of the cameras equipped in the HMD 12 and a region that is not the field-of-view range may be set as the boundary surface 76.

Further, in the case where the sensor unit 40 of the HMD 12 includes the cameras, an optimum permissible region may be calculated on the basis of images shot by the cameras while the user rotates 360 degrees around himself or herself.

Here, the calculation of the optimum permissible region may be executed by using an object recognition algorism performed by the HMD 12, the entertainment device 14, or the relay device 16. Further, a desired permissible region may be set by allowing the permissible region having been calculated in such a way as described above to be adjusted according to a trajectory of one of the sensors mounted in the controller 22 moved by the user, operations by the user with respect to buttons equipped in the controller 22, or any other similar way.

Further, for example, the boundary surface 76 may be set during the play of a game. For example, during the play of a game, the boundary surface 76 may be set such that a region occupied by an object specified on the basis of the result of image recognition processing (object recognition processing) on images shot by a camera arranged in the real space 70 is included in the impermissible region. In this way, setting the boundary surface 76 in advance before the play of the game becomes unnecessary.

Here, when the user has approached the boundary surface 76, the boundary surface object 78 may be updated so as to be opaque (visible). Further, when the user has approached the boundary surface 76, the user may be notified of an alarm. For example, an image representing the alarm may be displayed on the display unit 38. Further, a predetermined alarm sound or an alarm sound using a specific audio such as "Please be careful as you are approaching the boundary" may be supplementarily output from the HMD 12.

Further, when the user has approached the boundary surface object 78, a string of characters representing an alarm such as "Please be careful as you are approaching the boundary" may be supplementarily displayed on the display unit 38 of the HMD 12.

Further, when the user has approached the boundary surface object 78, an audio such as an alarm sound may be output from the HMD 12 simultaneously with the display of a string of characters representing an alarm on the display unit 38 of the HMD 12.

In this way, the user is able to notice the boundary surface 76 having been set during the play of a game. Here, the configuration may be made such that the user is able to change the boundary surface 76 having been set during the play of the game, when needed.

In addition, a situation may arise in which the user does not like the boundary surface 76 having been set on the basis of the result of the image recognition processing (object recognition processing). In order to prepare for such a situation, the configuration may be made such that the function of setting the boundary surface 76 on the basis of the result of the image recognition processing (object recognition processing) on the images shot by the camera arranged in the real space 70 can be turned off.

Further, the positions of the hands and feet of the user inside the real space 70 may be tracked on the basis of the result of image recognition processing on images shot by the cameras 20a. Further, when the hands and/or feet being tracked have approached the boundary surface 76, part or the whole of the boundary surface object 78 may be displayed on the display unit 38 equipped in the HMD 12. Further, when the hands and/or feet being tracked have approached the boundary surface 76, the display of an image representing an alarm, such as that described above, and/or the output of an alarm sound, such as that described above, may be performed. In this way, even when only the feet of the user have approached the boundary surface 76, the user can be notified of this situation. Further, the configuration may be made such that tracking the hand makes it possible for the user to perform the above-described series of boundary surface setting operations without using the controllers 22. For example, the configuration may be made such that a user's operation of sticking his or her index finger makes it possible for the user to perform the above-described series of boundary surface setting operations.

Further, the configuration may be made such that the setting of the boundary surface 76 can be made for each of programs to be executed, or each kind of programs to be executed such as a game program and an application program. Further, for each of programs or each kind of programs, a boundary surface 76 corresponding to each of programs or each kind of programs may be set in advance. Further, boundary surface data representing a boundary surface 76 having been set may be stored so as to be associated with the name or the kind of a program. The boundary surface data may be locally stored in the storage unit 52 of the entertainment device 14, or may be stored in a server on a network.

Further, when a program is executed, a boundary surface 76 in accordance with the program to be executed may be set by loading boundary surface data that is stored so as to be associated with the program. This configuration makes it possible to set a boundary surface 76 recommended in a program such as a game program. Further, the configuration may be made such that the boundary surface 76 having been set in such a way as described above can be changed by the user.

Further, the division of roles of, for example, the HMD 12, the entertainment device 14, and the relay device 16 is not limited to the above-described division of roles. For example, part or the whole of the functions illustrated in FIG. 7 may be implemented by the HMD 12.

Further, the above-described specific strings of characters and numeric values and the specific strings of characters and numeric values in the drawings are just examples, and the present invention is not limited to these strings of characters and numeric values.

The invention claimed is:

1. A boundary setting device comprising:
    a boundary surface setting section that sets a boundary surface for delimiting a permissible region that is a region which is located inside a real space and in which a user wearing a head-mounted display is permitted to exist and an impermissible region that is a region which is located inside the real space and in which the user is not permitted to exist; and
    a display control section that causes a portion or a whole of a virtual object representing the boundary surface to be displayed on the head-mounted display,
    wherein the boundary surface includes a first boundary line having a first height and a second boundary line having a second height, and
    a portion or all of the first boundary line is different from the second boundary line, wherein:
    according to an operation of setting the first boundary line and the second boundary line, the boundary surface setting section sets the boundary surface including the first boundary line and the second boundary line, and
    according to the operation of setting the first boundary line and the second boundary line, the boundary surface setting section sets the boundary surface that, for a height lower than the first height, includes a boundary line obtained by parallel-shifting of the first boundary line and that, for a height higher than the second height, includes a boundary line obtained by parallel-shifting of the second boundary line.

2. The boundary setting device according to claim 1, wherein the boundary surface setting section sets the boundary surface including the first boundary line and the second boundary line that are set on a basis of a trajectory of a sensor that the user moves inside the real space.

3. The boundary setting device according to claim 1, wherein, according to an operation by the user for setting a point located inside the real space, the boundary surface setting section sets the boundary surface that is a spherical surface having a center on the point.

4. The boundary setting device according to claim 3, wherein, according to an operation of further setting a length, the boundary surface setting section sets the boundary surface that is a spherical surface having a center on the point and having a radius according to the length.

5. The boundary setting device according to claim 1, wherein the boundary surface setting section sets the boundary surface circumscribing a trajectory of a sensor that the user moves inside the real space.

6. The boundary setting device according to claim 1, wherein the boundary surface setting section sets the boundary surface for delimiting a region that is a field-of-view range of a camera arranged in the real space and a region that is not the field-of-view range.

7. The boundary setting device according to claim 1, wherein the boundary surface setting section specifies an object arranged inside the real space, on a basis of a result of image recognition processing on an image shot by a camera arranged in the real space, and sets the boundary surface such that a region occupied by the object is included in the impermissible region.

8. The boundary setting device according to claim 1, wherein, according to an operation by the user for setting a region located more inside than the boundary surface, the boundary surface setting section changes the boundary surface such that the region is included in the impermissible region.

9. The boundary setting device according to claim 1, wherein, according to an operation by the user for setting a region located more outside than the boundary surface, the boundary surface setting section changes the boundary surface such that the region is included in the permissible region.

10. A boundary setting method comprising:
setting a boundary surface for delimiting a permissible region that is a region which is located inside a real space and in which a user wearing a head-mounted display is permitted to exist and an impermissible region that is a region which is located inside the real space and in which the user is not permitted to exist; and
causing a portion or a whole of a virtual object representing the boundary surface to be displayed on the head-mounted display,
wherein the boundary surface includes a first boundary line having a first height and a second boundary line having a second height, and
a portion or all of the first boundary line is different from the second boundary line, wherein:
according to an operation of setting the first boundary line and the second boundary line, the setting includes setting the boundary surface including the first boundary line and the second boundary line, and
according to the operation of setting the first boundary line and the second boundary line, the setting includes setting the boundary surface that, for a height lower than the first height, includes a boundary line obtained by parallel-shifting of the first boundary line and that, for a height higher than the second height, includes a boundary line obtained by parallel-shifting of the second boundary line.

11. A non-transitory, computer readable storage medium containing a computer program, which when executed by a computer, causes the computer to perform a boundary setting method by carrying out actions, comprising:
setting a boundary surface for delimiting a permissible region that is a region which is located inside a real space and in which a user wearing a head-mounted display is permitted to exist and an impermissible region that is a region which is located inside the real space and in which the user is not permitted to exist; and
causing a portion or a whole of a virtual object representing the boundary surface to be displayed on the head-mounted display,
wherein the boundary surface includes a first boundary line having a first height and a second boundary line having a second height, and
a portion or all of the first boundary line is different from the second boundary line, wherein:
according to an operation of setting the first boundary line and the second boundary line, the setting includes setting the boundary surface including the first boundary line and the second boundary line, and
according to the operation of setting the first boundary line and the second boundary line, the setting includes setting the boundary surface that, for a height lower than the first height, includes a boundary line obtained by parallel-shifting of the first boundary line and that, for a height higher than the second height, includes a boundary line obtained by parallel-shifting of the second boundary line.

* * * * *